(12) United States Patent
Fabre et al.

(10) Patent No.: US 8,722,117 B2
(45) Date of Patent: May 13, 2014

(54) METHOD AND APPARATUS FOR THERMAL SEALING A FILLED CONFECTIONERY PRODUCT

(75) Inventors: Juan Fabre, Sant Cugat del Valles (ES); Dennis Abad, Woodridge, IL (US); Luis Bordera, Sabadell (ES); Andrew Robert Francis Gill, Devon (GB); Melchor Blazquez, Badalona (ES); Emilio Romero Carcason, Sant Quirze del Valles (ES)

(73) Assignee: Wm. Wrigley Jr. Company, Chicago, IL (US)

( * ) Notice: Subject to any disclaimer, the term of this patent is extended or adjusted under 35 U.S.C. 154(b) by 1329 days.

(21) Appl. No.: 12/133,115

(22) Filed: Jun. 4, 2008

(65) Prior Publication Data

US 2009/0304855 A1 Dec. 10, 2009

(51) Int. Cl.
*A23G 4/20* (2006.01)

(52) U.S. Cl.
CPC .................................. *A23G 4/205* (2013.01)
USPC ........................................................... 426/5

(58) Field of Classification Search
USPC ................................................ 426/3, 4, 5, 6
See application file for complete search history.

(56) References Cited

U.S. PATENT DOCUMENTS

| | | |
|---|---|---|
| 2,973,273 A | 2/1961 | Curtiss |
| 3,395,021 A | 7/1968 | Glicksman |
| 3,541,946 A * | 11/1970 | Johnston ..................... 425/133.1 |
| 3,632,358 A | 1/1972 | Echeandia |
| 3,806,290 A | 4/1974 | Graff |
| 3,857,963 A | 12/1974 | Graff |
| 3,894,154 A | 7/1975 | Graff |
| 4,063,964 A | 12/1977 | Oberwelland |
| 4,156,740 A | 5/1979 | Glass |
| 4,157,402 A | 6/1979 | Ogawa |
| 4,250,196 A | 2/1981 | Friello |
| 4,252,829 A | 2/1981 | Terrevazzi |
| 4,301,178 A | 11/1981 | Witzel |
| 4,316,915 A | 2/1982 | Friello |
| 4,468,185 A | 8/1984 | Jamsen |
| 4,543,769 A | 10/1985 | Schmitz |
| 4,601,907 A | 7/1986 | Knebl |

(Continued)

FOREIGN PATENT DOCUMENTS

| | | |
|---|---|---|
| CA | 1016388 | 8/1997 |
| EP | 0086956 | 7/1986 |

(Continued)

OTHER PUBLICATIONS

Packaging for Trident Splash gum, Jun. 1, 2006.

(Continued)

*Primary Examiner* — Nikki H Dees
(74) *Attorney, Agent, or Firm* — K&L Gates LLP

(57) ABSTRACT

The present disclosure provides a method for thermally sealing a filled chewing gum product. The fill material of the chewing gum product is heated to a temperature greater than about 40° C. which correspondingly heats the inner portion of the chewing gum material to an elevated temperature. The method further includes sealing the heated inner portion of the chewing gum material to form a sealed, filled chewing gum product. The present disclosure advantageously increases the bond strength of the sealed ends of the sealed and filled chewing gum product and reduces the amount of unacceptable product or leakers.

17 Claims, 14 Drawing Sheets

(56) References Cited

U.S. PATENT DOCUMENTS

| | | |
|---|---|---|
| 4,642,235 A | 2/1987 | McGrew |
| 4,683,138 A | 7/1987 | Glass |
| 4,938,128 A | 7/1990 | Knebl |
| 4,938,971 A | 7/1990 | Chapdelaine |
| 4,949,630 A | 8/1990 | Knebl |
| 4,975,288 A | 12/1990 | Hager |
| 4,980,178 A | 12/1990 | Cherukuri |
| 5,002,791 A | 3/1991 | Knebl |
| 5,035,905 A | 7/1991 | Knebl |
| 5,120,554 A | 6/1992 | Farnsworth |
| 5,125,819 A | 6/1992 | Hager |
| 5,242,693 A | 9/1993 | Kurihara |
| 5,344,659 A | 9/1994 | Kurihara |
| 5,458,894 A | 10/1995 | Knebl |
| 5,498,429 A | 3/1996 | Orlandi |
| 5,955,116 A | 9/1999 | Hehoe |
| 6,280,780 B1 | 8/2001 | Degady |
| 6,284,291 B1 | 9/2001 | Siecke |
| 6,472,001 B1 | 10/2002 | Bunkers |
| 6,506,401 B1 | 1/2003 | Rothamel |
| 6,558,727 B2 | 5/2003 | Degady |
| 6,623,266 B2 | 9/2003 | Jani |
| 6,787,167 B1 | 9/2004 | Stahl |
| 6,838,098 B2 | 1/2005 | Bunkers |
| 6,878,366 B2 | 4/2005 | Dewis |
| 2002/0136812 A1 | 9/2002 | Degady |
| 2003/0059501 A1 | 3/2003 | Rivier |
| 2003/0066433 A1 | 4/2003 | Rothamel |
| 2003/0138518 A1 | 7/2003 | Kiefer |
| 2004/0037924 A1 | 2/2004 | Jani |
| 2004/0037925 A1 | 2/2004 | Jani |
| 2004/0180110 A1 | 9/2004 | Mistry |
| 2004/0234459 A1 | 11/2004 | Faust |
| 2005/0025721 A1 | 2/2005 | Home |
| 2005/0042257 A1 | 2/2005 | Dewis |
| 2005/0100633 A1 | 5/2005 | Bunkers |
| 2005/0260317 A1 | 11/2005 | Cotton |
| 2005/0260329 A1 | 11/2005 | Yusuf |
| 2006/0034936 A1 | 2/2006 | Lakkis |
| 2006/0045934 A1 | 3/2006 | Kabse |
| 2006/0051456 A1 | 3/2006 | Kabse |
| 2006/0062872 A1 | 3/2006 | Gebreselassie |
| 2006/0263412 A1 | 11/2006 | Pan |
| 2006/0263475 A1 | 11/2006 | Jani |
| 2006/0263476 A1 | 11/2006 | Jani |
| 2006/0280834 A1 | 12/2006 | Jani |
| 2006/0280835 A1 | 12/2006 | Jani |
| 2006/0280836 A1 | 12/2006 | Jani |
| 2006/0280837 A1 | 12/2006 | Jani |
| 2006/0286201 A1 | 12/2006 | Jani |
| 2007/0003663 A1 | 1/2007 | Jani |
| 2007/0104828 A1 | 5/2007 | Fornaguera |
| 2007/0104830 A1 | 5/2007 | Fornaguera |

FOREIGN PATENT DOCUMENTS

| | | |
|---|---|---|
| JP | 01-168243 | 7/1989 |
| JP | 06-030707 | 2/1994 |
| JP | 2007-50827 | 4/2007 |
| WO | 90-00018 | 1/1990 |
| WO | 90-138939 | 5/1990 |
| WO | 94-01002 | 1/1994 |
| WO | 95-27402 | 10/1995 |
| WO | 95-27404 | 10/1995 |
| WO | 96-11582 | 4/1996 |
| WO | 00-30465 | 6/2000 |
| WO | 01-10238 | 2/2001 |
| WO | 02-056697 | 7/2002 |
| WO | 2005-048728 | 6/2005 |
| WO | 2006-127754 | 11/2006 |
| WO | 2006-127928 | 11/2006 |
| WO | 2007/056685 | 5/2007 |

OTHER PUBLICATIONS

International Preliminary Report on Patentability for International Application No. PCT/US2009/046096 mailed on Dec. 16, 2010.

* cited by examiner

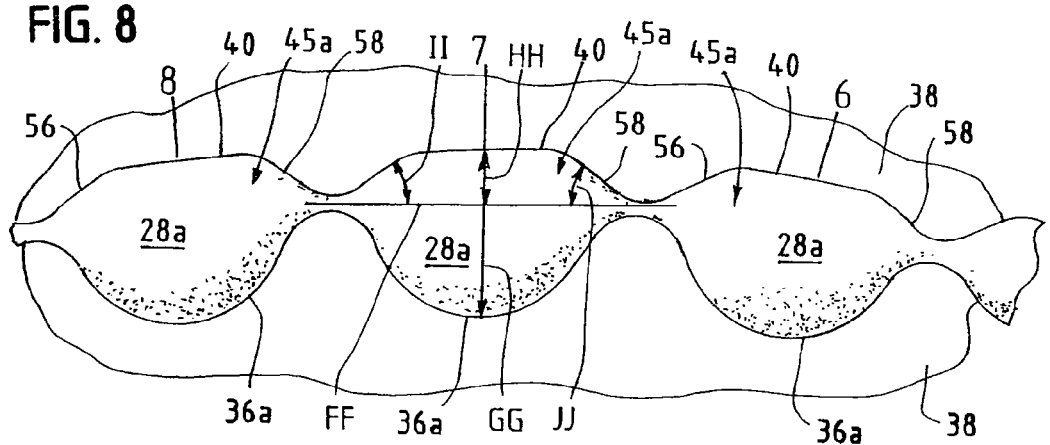
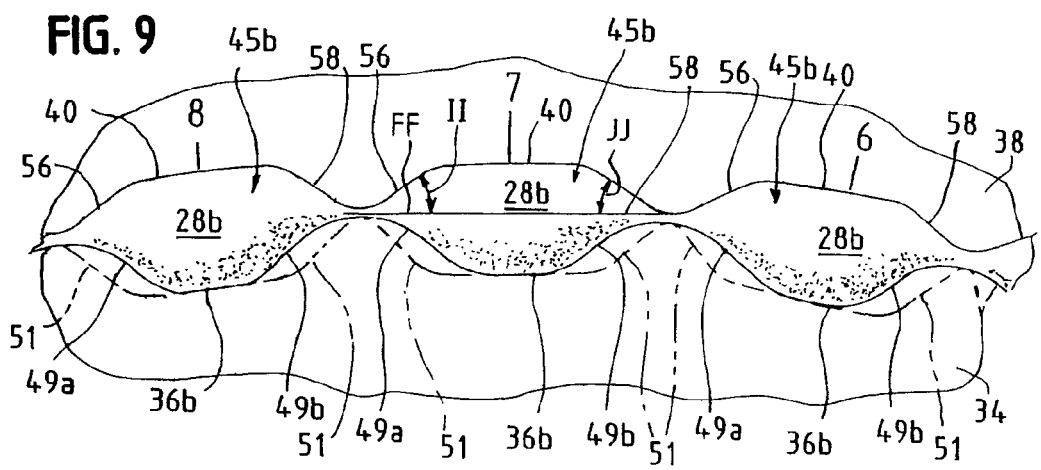

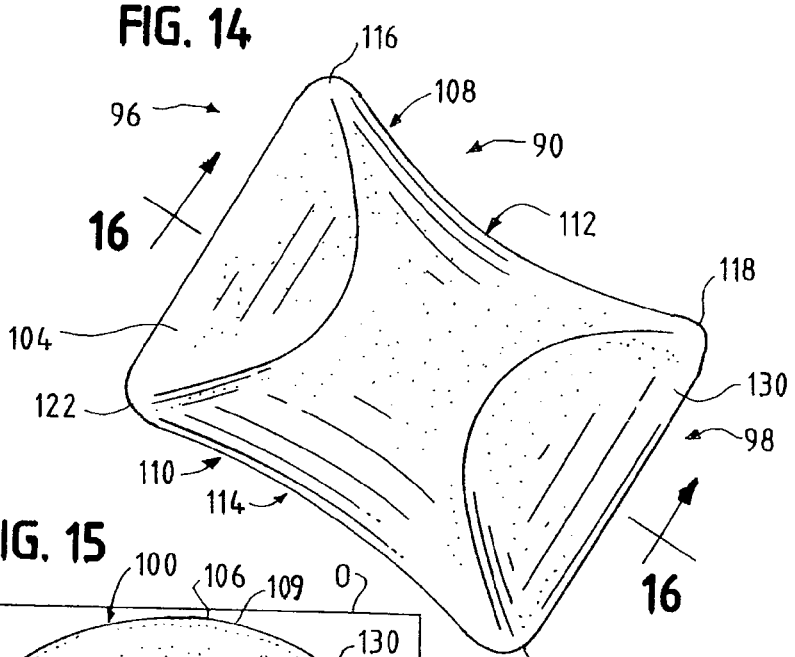
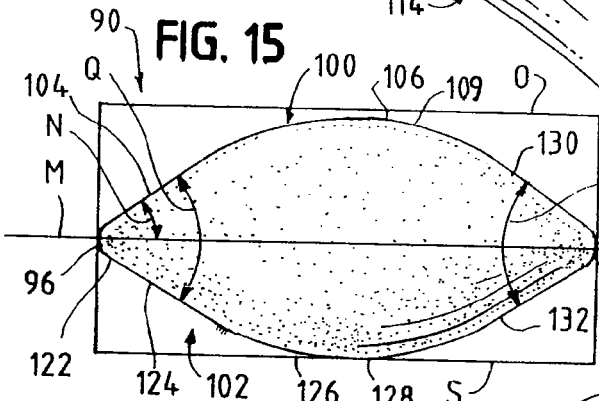
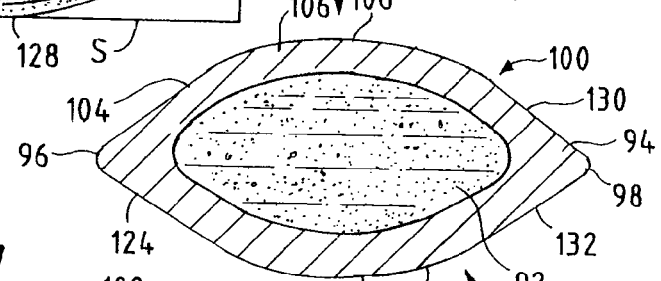
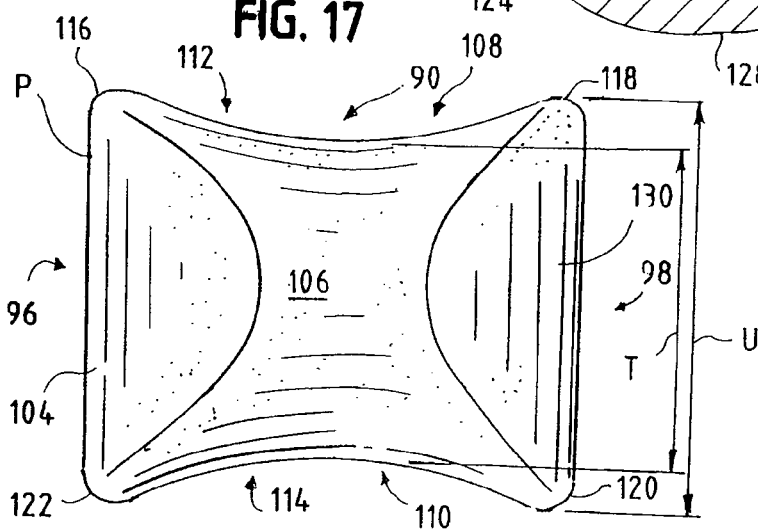

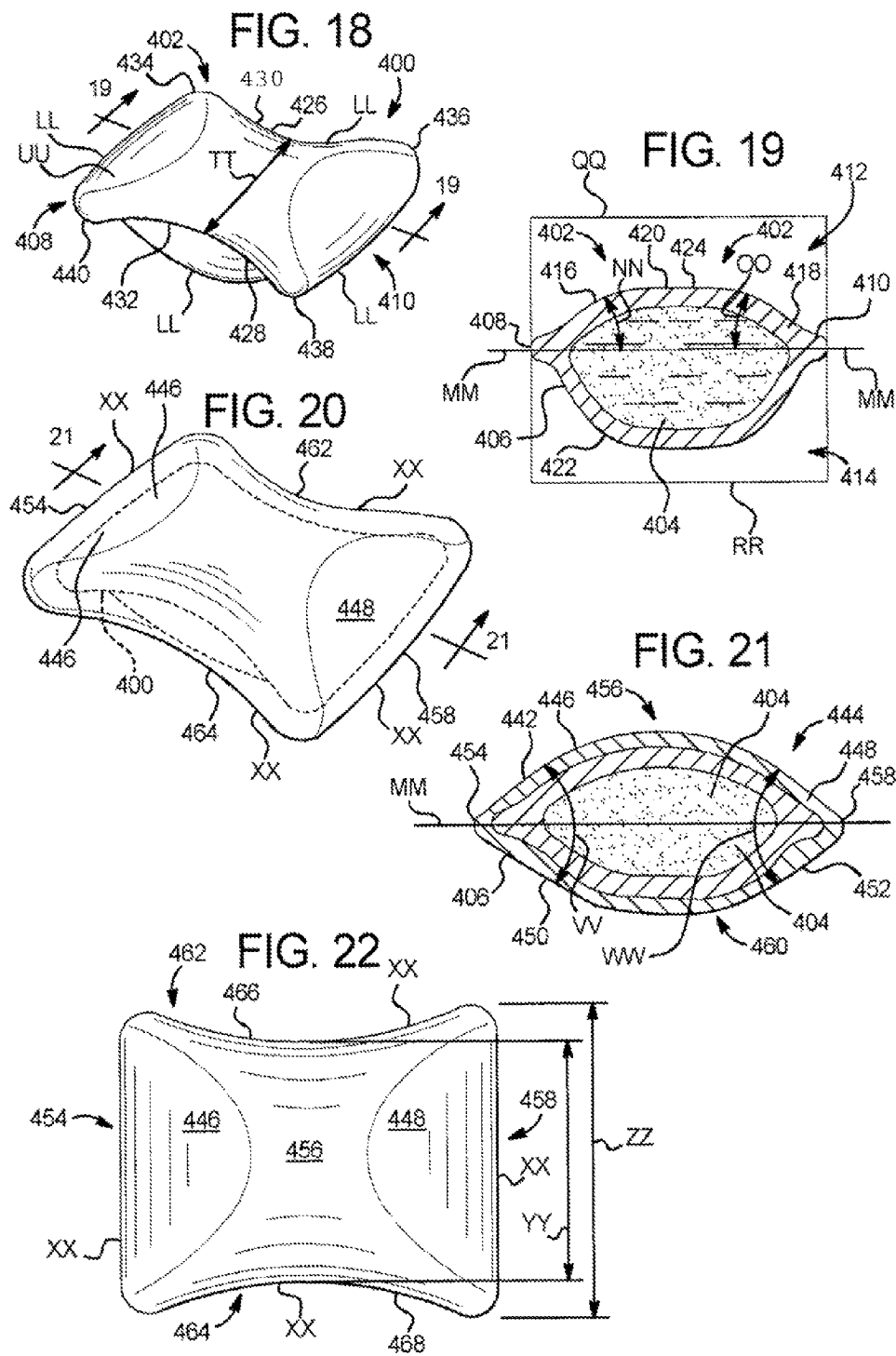

METHOD AND APPARATUS FOR THERMAL SEALING A FILLED CONFECTIONERY PRODUCT

BACKGROUND

The present disclosure relates generally to chewing gum products and apparatuses and methods for making the same.

Center-filled chewing gum products enjoy widespread consumer appeal. Production systems for keeping pace with the high consumer demand for these products typically include a forming device which feeds a center-filled chewing gum rope between opposing first and second forming members. The forming members cooperatively engage to form the rope into sealed center-filled chewing gum pieces.

SUMMARY

The present disclosure is directed to an improved method and apparatus for forming a filled chewing gum product. In an embodiment, a method for producing a chewing gum product is provided. The method includes extruding a rope of a chewing gum material having an outer layer of a chewing gum material with a first temperature and a center having a fill material with a second temperature, and sealing an end of the chewing gum material. The sealing occurs when the second temperature is greater than the first temperature. The method may further include sealing opposing ends of the chewing gum material to form a sealed filled chewing gum piece.

In an embodiment, the method includes feeding the rope between a first forming member and a second forming member cooperatively engageable with the first forming member and removing the sealed filled chewing gum piece from at least one of the forming members.

The outer and the inner layers may have a difference in temperatures. In an embodiment, the difference between the first temperature and the second temperature is at least about 1° C.

The outer and the inner layers may have a difference in temperatures. In an embodiment, the difference between the first temperature and the second temperature is at least about 2° C.

The outer and the inner layers may have a difference in temperatures. In an embodiment, the difference between the first temperature and the second temperature is at least about 3° C.

The outer and the inner layers may have a difference in temperatures. In an embodiment, the difference between the first temperature and the second temperature is at least about 4° C.

The outer and the inner layers may have a difference in temperatures. In an embodiment, the difference between the first temperature and the second temperature is at least about 5° C.

In an embodiment, the method includes cooling an outer portion of the outer layer to a temperature from about 20° C. to about 40° C. The outer portion may be cooled by contact with chilled forming members. Alternatively, the outer portion may be cooled, for example, with a device that sprays chilled air directly onto the outer portion.

In an embodiment, the method includes sealing opposing ends of the rope and forming a filled chewing gum piece that is asymmetrical along a plane extending through the opposing sealed ends.

In an additional embodiment, a method for producing a center-filled chewing gum product is provided. The method includes heating a liquid composition to a predetermined temperature, coextruding a center-filled chewing gum rope comprising an outer layer of a chewing gum composition and an inner layer of the liquid composition, crimping the center-filled rope in a first position to form a first seal, crimping the center-filled rope in a second position to form a second seal, and separating the rope at the first and second seals to form a center-filled chewing gum piece. The temperature of the outer layer is controlled by adjusting the extruder operating parameters to obtain a temperature in the outer layer which is lower than the temperature of the inner layer when the center-filled chewing gum rope exits the coextruder.

In an embodiment, the method includes heating the liquid composition to a temperature from about 45° C. to about 55° C.

In an embodiment, the temperature of the outer layer is at least about 1° C. lower than the temperature of the inner layer when the center-filled chewing gum rope exits the coextruder.

In an embodiment, the temperature of the outer layer is at least about 2° C. lower than the temperature of the inner layer when the center-filled chewing gum rope exits the coextruder.

In an embodiment, the temperature of the outer layer is at least about 3° C. lower than the temperature of the inner layer when the center-filled chewing gum rope exits the coextruder.

In an embodiment, the temperature of the outer layer is at least about 4° C. lower than the temperature of the inner layer when the center-filled chewing gum rope exits the coextruder.

In an embodiment, the temperature of the outer layer is at least about 5° C. lower than the temperature of the inner layer when the center-filled chewing gum rope exits the coextruder.

In yet another embodiment, a series of center-filled chewing gum products is provided. The series of center-filled chewing gum products includes at least a first piece and a second piece, the first and second pieces each having a separate fill material with a temperature greater than about 40° C.

In an embodiment, the center-filled chewing gum product includes a land extending between an end of the first piece and an end of the second piece.

In still yet another embodiment, a method for producing a center-filled chewing gum product is provided. The method includes providing a center-filled chewing gum rope having a chewing gum layer and a center fill material, introducing the center-filled chewing gum rope into a forming device, and crimping the center-filled chewing gum rope in the forming device in a plurality of locations to form a plurality of center-filled chewing gum pieces. The outer portion of the chewing gum layer is at a temperature that allows the outer portion to contain the center fill material without leaking. Further, the inner portion of the chewing gum layer is at a temperature suitable for the inner portion to adhesively bond with itself to form a leak-free seal during crimping.

In an embodiment, the temperature of the outer portion of the chewing gum layer is less than the temperature of the inner portion of the chewing gum layer during crimping.

In an embodiment, the method includes coating the center-filled chewing gum pieces.

In an embodiment, the method includes forming the center-filled chewing gum rope by a coextrusion process.

In an embodiment, the temperature difference between the outer and inner portions of the chewing gum layer is at least about 5° C.

In another embodiment, a chewing gum product is provided. The chewing gum product includes a body having an outer layer of a chewing gum material and a center having a fill material. The outer layer of chewing gum material may have an inner portion and an outer portion, and the temperature of the inner portion may be from about 0° C. to about 10° C. greater than the temperature of the outer portion.

In an embodiment, the body includes opposing sealed ends.

In an embodiment, the chewing gum product includes a coating on the body to form a coated chewing gum product.

In an embodiment, the chewing gum product includes a tapered portion extending between a middle section of the body and a sealed end.

In an embodiment, the chewing gum product has a pillow shape.

In an embodiment, the outer layer of chewing gum material is selected from the group consisting of a sugar chewing gum, a sugarless chewing gum, and combinations thereof.

In an embodiment, the chewing gum product includes a first lateral side and an opposing lateral second side. The sides and the sealed ends may form a product perimeter, and each side may have an inwardly curved portion. The perimeter may have a substantially hour-glass shape.

Advantages of embodiments of the present disclosure will now be set forth. It should be noted that not all of these advantages may be met by any specific embodiment of the present disclosure.

It is an advantage of the present disclosure to provide an improved method for making chewing gum.

It is an advantage of the present disclosure to provide an improved chewing gum.

It is an advantage of the present disclosure to provide a filled chewing gum with sealed ends with improved sealability.

It is an advantage of the present disclosure to provide a filled chewing gum product with a heat stable fill material.

It is an advantage of the present disclosure to provide a filled chewing gum product with sealed ends having improved bond strength.

It is an advantage of the present disclosure to provide a method for forming filled chewing gum products that reduces the number of unsealed, partially sealed, or improperly sealed filled chewing gum pieces.

It is an advantage of the present disclosure to increase production efficiencies by increasing the releasability of sealed filled chewing gum pieces from a forming device.

Additional features and advantages are described herein, and will be apparent from, the following Detailed Description and the figures.

BRIEF DESCRIPTION OF THE FIGURES

FIG. 8 is an enlarged elevation view of area 11 of FIG. 10.

FIG. 9 is an enlarged elevation view of an embodiment of area 11.

FIG. 14 is a perspective view of a center-filled chewing gum product of the present disclosure.

FIG. 15 is an elevation view of the center-filled chewing gum product of FIG. 14.

FIG. 16 is a sectional view taken along line 16-16 of FIG. 14.

FIG. 17 is a perspective view of a center-filled chewing gum product of the present disclosure.

FIG. 18 is a perspective view of a center-filled chewing gum product of the present disclosure.

FIG. 19 is a sectional view taken along line 19-19 of FIG. 18.

FIG. 20 is a perspective view of a coated center-filled chewing gum product of the present disclosure.

FIG. 21 is a sectional view taken along line 21-21 of FIG. 20.

FIG. 22 is a plan view of a coated chewing gum product of the present disclosure.

DETAILED DESCRIPTION

Figure 1:
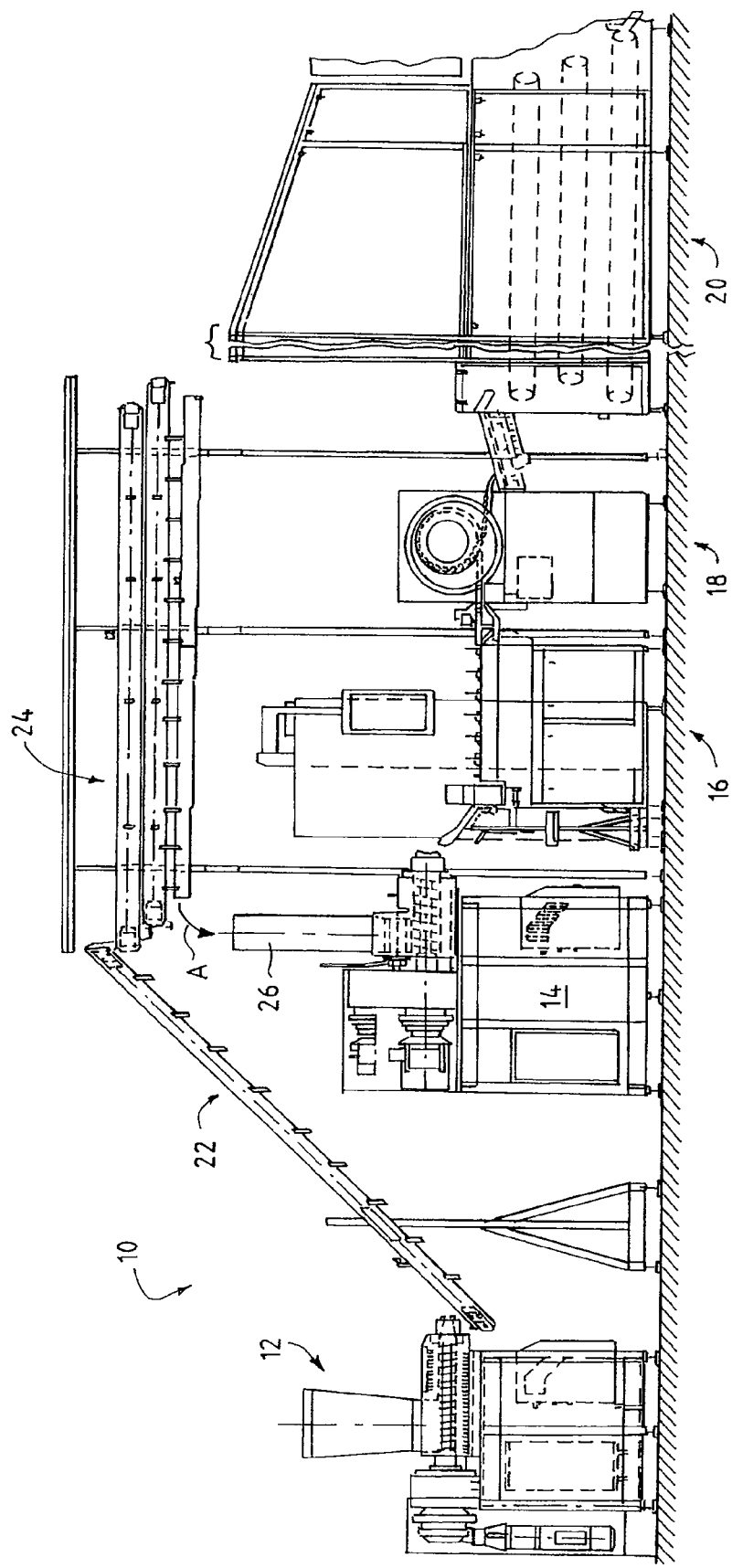
FIG. 1 is a schematic view of an apparatus for the production of a center-filled chewing gum product of the present disclosure.

Referring to the Figures generally, and in particular to FIG. 1, an apparatus 10 for producing center-filled chewing gum is shown. Apparatus 10 includes a pre-extruder 12, a coextrusion device 14, a sizing device 16, and a forming device 18, and a cooling chamber 20, each of which will be discussed in detail.

The pre-extruder 12 receives chewing gum material from a source of chewing gum material (not shown) such as a mixer, feeder belt, or hopper, for example. The chewing gum material may be sugar or sugarless chewing gum in plastic or fluid form. In other words, the chewing gum material, when heated, forms a viscous paste or fluid that may be extruded as is commonly known in the art. The plastic chewing gum material may be subsequently cooled or solidified at room temperature to form a solid or semi-solid chewing gum. Although the present disclosure is directed to chewing gum, apparatus 10 may be used to form other extrudable center-filled items such as other extrudable foods (i.e., non-gum confections, starches, pastas) as well as center-filled polymeric materials and products.

The pre-extruder 12 extrudes a continuous chewing gum extrudate onto a conveyor 22 for delivery to the coextrusion device 14. The chewing gum extrudate may have any shape or geometric form as desired including such nonlimiting examples as a rope, a sheet, a slab, or a strand with any desired thickness as is commonly known in the art. In an embodiment, the chewing gum extrudate may have a width of about 250 mm and a thickness of about 10 mm. Providing a pre-extruder 12 ensures that the chewing gum extrudate extruded from the pre-extruder 12 is thoroughly uniform in density and shape for consistent feeding into the coextruder 14. Providing a thoroughly uniform chewing gum mass may reduce the risk of voids or imperfections in the mass, which may, in turn, reduce the risk of defects in, for example, a rope of center-filled chewing gum. Even the slightest defect in the integrity of an outer chewing gum portion of the rope may be enough to cause the center-fill composition to leak out of the outer chewing gum portion. If the leakage should occur during a coating operation, an entire batch of coated, center-filled chewing gum could be ruined. Therefore, it is beneficial to provide uniform consistency and shape of the chewing gum material prior to coextrusion.

In an embodiment, the conveyor 22 may receive the chewing gum extrudate from the pre-extruder 12 and deliver the chewing gum extrudate to one or more relaxation belts 24. Transport of the chewing gum extrudate along the relaxation belt 24 permits the chewing gum extrudate to cool and rebound from the pre-extrusion process. The relaxation belt 24 may be of a sufficient length, or may run at a sufficient speed, so as to allow the chewing gum extrudate to relax and equilibrate before entering the coextrusion device 14. As used herein, "equilibrate" means that the any internal stresses and/or temperature variations imparted to the chewing gum extrudate from the pre-extruder 12 are relaxed such that the internal stresses and/or temperature variations are neutralized, or allowed to come to equilibrium prior to coextrusion. The relaxation belt 24 may include one, long belt that travels at a slower speed to allow the chewing gum extrudate sufficient time to relax after extrusion. Similarly, the relaxation belt 24 may also include several relaxation belts that are arranged in series as shown in FIG. 1. In this embodiment, a first relaxation belt may deliver the chewing gum extrudate to a second relaxation belt, which may deliver the chewing gum extrudate to a third relaxation belt and so forth. Relaxation of the chewing gum extrudate provides a chewing gum extrudate that is more consistent, stable, and has the lowest stress possible prior to coextrusion.

In an embodiment, the chewing gum extrudate may enter an inlet 26 of the coextrusion device 14 as indicated by arrow A of FIG. 1. The relaxation belt 24 preferably delivers to the inlet 26 the chewing gum extrudate which is consistent in temperature and elasticity throughout the entire length and width of the chewing gum extrudate. A consistent and uniform chewing gum extrudate will yield a more consistent product at all production stages downstream of the relaxation belt 24. The coextrusion device 14 may include an inner passageway (not shown) coaxially disposed within an outer passageway (not shown). The inner passageway may receive and coextrude a material having a plastic-like consistency along with the extrusion of the chewing gum material from the outer passageway as is commonly known in the art.

In an embodiment, the inner passageway may be in communication with a source of a flowable or fluid center-fill material as is commonly known in the art. The center-fill material or fluid-fill material may be a liquid, a semi-liquid, a paste, a gel, a semi-solid, a flowable solid, and combinations thereof. A nonlimiting example of a fluid solid may be a flowable solid material such as a granular or powder material. The fluid material may be any hard candy, soft candy, chewing gum, or other confectionery substance, or compound that has a fluid phase, may take a fluid form, or may be flowable. The fluid material may be heated, melted, dissolved, form a syrup, or become flowable or fluid as is commonly known in the art. Consequently, the fluid material may be a liquid, a syrup, a gel, a paste, or a flowable solid such as a granular solid or a confectionery in powder form at ambient conditions. In an embodiment, the fluid material may be a liquid with a viscosity that may be adjusted as desired. The fluid may be further sweetened, flavored, and/or colored as desired.

Figure 2:
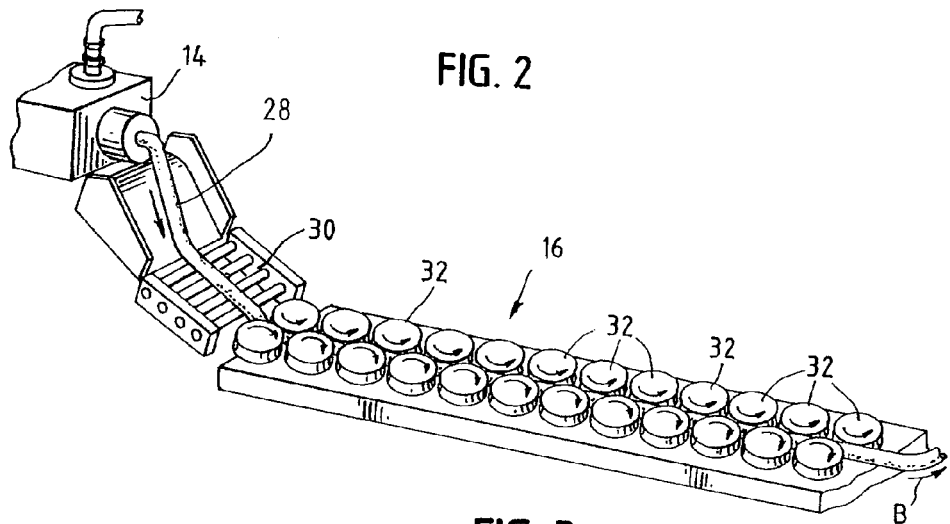
FIG. 2 is a perspective view of a coextrusion device and a sizing device of the present disclosure.

In an embodiment, the coextrusion device 14 may coextrude a rope 28 of a center-filled chewing gum as shown in FIG. 2. A transport device 30 may deliver the rope 28 to the sizing device 16. The sizing device 16 may include a plurality of roller pairs 32 to size or otherwise reduce the diameter of the rope as is commonly known in the art. The rollers 32 may move the rope 28 through the sizing device 16 in the direction as indicated by arrow B.

Figure 3:
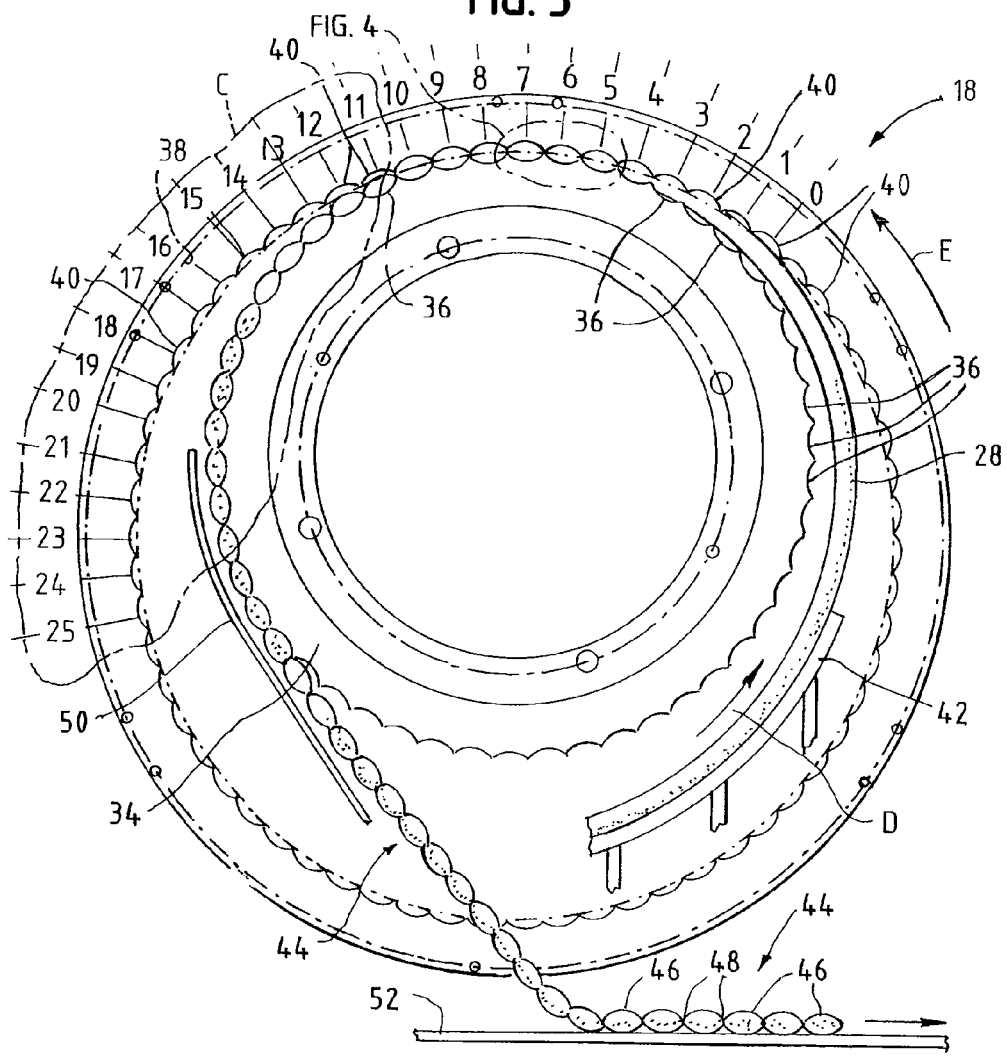
FIG. 3 is a side elevation view of a forming device of the present disclosure.

The sizing device 16 delivers the rope 28 to the forming device as shown in FIG. 3. The forming device may be any forming device known in the art. Therefore, it should be understood that the forming device need not be limited to the forming device disclosed herein. In an embodiment, the forming device 18 may include a first wheel 34 having one or more first forming members 36. The first forming members 36 may be located on an outer surface of the first wheel 34. In an embodiment, the forming members 36 may be spaced along an outer circumferential surface (or an outer peripheral surface) of the first wheel 34.

The forming device 18 may also include a second wheel 38 having one or more second forming members 40. The second forming members 40 may be located on an inner surface of the second wheel 38. In an embodiment, the second forming members 40 may be spaced along an inner circumferential surface (or an inner peripheral surface) of the second wheel 38. As can be seen in FIG. 3, the first wheel 34 and the second wheel 38 are rotatable, yet the two wheels do not share a common axis of rotation. The first and second wheels 34, 38 may be arranged and/or configured so that upon rotation of the first and second wheels 34, 38, the first forming members 36 and the second forming members 40 may come into gradual registration with each other or otherwise come into mated engagement with each other. In other words, the first forming members 36 may come into cooperative engagement (either continuously or intermittently as desired) with the second forming members 40 at substantially the top of the forming device 18 as shown in FIG. 3. This is accomplished by having the axis of the first wheel 34 laterally offset from that of the second wheel 38 while both axes remain located in, and oriented perpendicular to, the common plane of rotation for the two wheels.

In an embodiment, the area of cooperative engagement of the first and second wheels 36, 38 may include a plurality of zones of registration, or zones of cooperative engagement, between the first and second wheels 34, 38 as shown by enumerated zones 0-13 in FIG. 3. However, it is to be understood that the total number of forming members on each wheel would not necessarily be equal and that the corresponding relationship of the first and second forming members 36, 40 in this case would change with each rotation of the first wheel 34. In other words, a particular first forming member 36 would mate with different second forming members 40 with each revolution of the first wheel 34. Each wheel may be rotated by a suitable drive mechanism in the direction as indicated by arrow E (in FIG. 3), as is commonly known in the art. In the case where each wheel has a different number of forming members, parity of linear velocities of the two sets of forming members is achieved by rotating the second (outer) wheel 38 at a higher rotational speed (i.e., revolutions per minute) compared with the first (inner) wheel 34.

A guide 42 supports, directs, or otherwise continuously feeds the rope 28 of fluid filled chewing gum in the direction of arrow D and between the forming members 36, 40 of the first wheel 34 and the second wheel 38, respectively. With continued rotation of the first and second wheels 34, 38, the first forming members 36 and the second forming members 40 gradually approach each other while simultaneously coming into contact with the rope 28. With continued rotation, the first forming members 36 and the second forming members 40 pinch the rope 28 as shown in zones 0-3, for example. As the first and second wheels 34, 38 continue to rotate, the first forming members 36 and the second forming members 40 crimp the rope 28 as shown in zones 4-5. With continued rotation of the first and second wheels 34, 38, the first forming members 36 and the second forming members 40 come into full cooperative engagement with each other as shown in zones 5-9, for example. In full engagement, the first and second forming members 36, 40 are in the closest proximity with respect to each other. The crimping pressure imposed upon the rope 28 when the first and second forming members 36, 40 are in full cooperative engagement seals the chewing gum material on the opposing sides of the rope to each other. With continued rotation of the first and second wheels 34, 38, the distance between the first and the second forming members 36, 40 gradually increases, thereby enabling beaded rope 44 to separate from and exit forming device 18 as shown in zones 9-25. It is understood that the zones 0-13 are for illustration purposes and that the pinching, crimping, and sealing forces imposed upon the rope 28 by the first and second forming members 36, 40 may occur at one, some, or all of zones 0-13.

In an embodiment, the crimping portions of the first and second forming members 36, 40 do not meet and are, in fact, separated by a gap even at their point of closest engagement. Thus, the crimped pieces will not normally separate but rather form the beaded rope 44 as will be discussed below. In an alternate embodiment, the crimping portions of the corresponding first and second forming members 36, 40 do, in fact, meet, or at least come within sufficiently close proximity to effectively sever the piece from the beaded rope 44.

Figure 6:
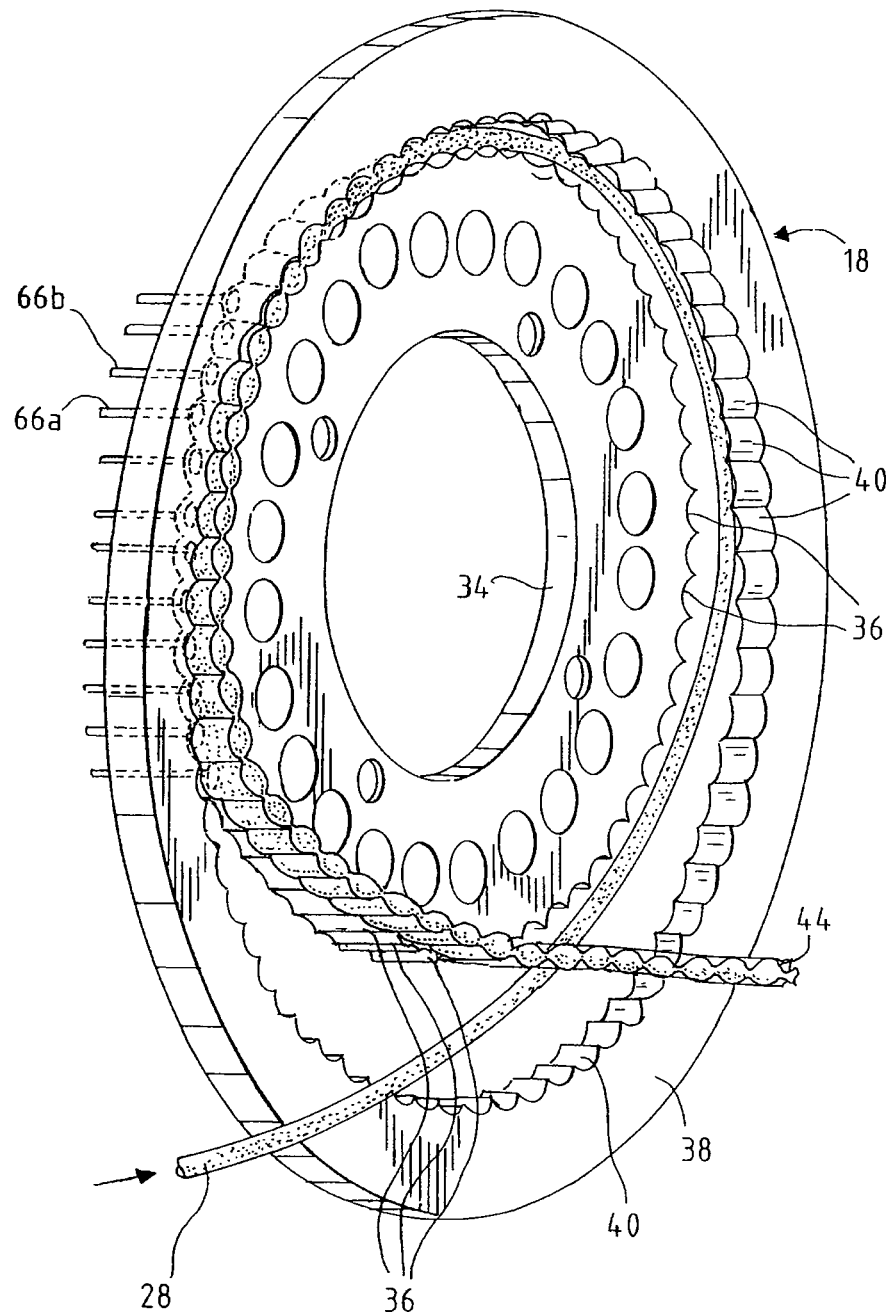
FIG. 6 is a perspective view of a first wheel and a second wheel of the present disclosure.

Upon disengagement of the first and second forming members 36, 40, the pinching, crimping, sealing, upon rope 28 in zones 0-13 forms the rope 28 into a beaded rope 44. The beaded rope 44 includes a plurality of sealed and fluid-filled chewing gum pieces 46 attached to one another at crimp segments 48. Each crimp segment 48 creates a land which adjoins or otherwise connects adjacent fluid-filled chewing gum pieces to each other. A guide 50 may be used to support and direct beaded rope 44 onto a transport device 52 as shown in FIG. 3. To remove the beaded rope 44 from a plane in which the first and second wheels 34, 38 rotate, the guide 50 may be used to direct the beaded rope 44 out of the plane. In this way, a portion of the top of the guide 50 extends from the plane at an angle away from the plane such that the beaded rope 44 may contact the top of guide 50 when the beaded rope 44 is in the plane, and may be guided out of the plane by the guide 50 in a direction similar to, for example, the direction of the beaded rope 44 as shown in FIG. 6. The guide 50 may have any shape known in the art and may be flat, semi-cylindrical, U-shaped, L-shaped, or any combination thereof. The transport device 52 (such as a conveyor) may transport or otherwise deliver the beaded rope 44 to the cooling chamber 20. A second transport device 54 may receive the beaded rope 44 and transport the beaded rope 44 in a different direction.

The formation of the beaded rope 44 is advantageous as the interconnection between the individual fluid-filled chewing gum pieces 46 promotes and eases the separation and removal of each chewing gum piece 46 from the first forming members 36 and/or the second forming members 40. The continuous separation motion of the beaded rope 44 and the weight of the beaded rope 44 portion that is already fully separated from the first forming members 36 provides an additional pulling or dropping force (due to gravity) upon individual chewing gum pieces 46 still remaining in contact with the first forming members 36. This additional pulling force substantially reduces-and may wholly eliminate the risk of the individual chewing gum pieces 46 from breaking off from the beaded rope 44 and remaining or otherwise sticking to the first forming members 36. This pulling/separation force provided by the beaded rope 44 is a force absent in conventional forming devices which form wholly discrete, individual pieces within the forming members. Further, the formation of the beaded rope 44 also contributes to a "controlled fall" of the beaded rope 44 that aids in reducing the risk of the individual chewing gum pieces 46 from being damaged in the process of exiting the forming device 18.

Figure 4:
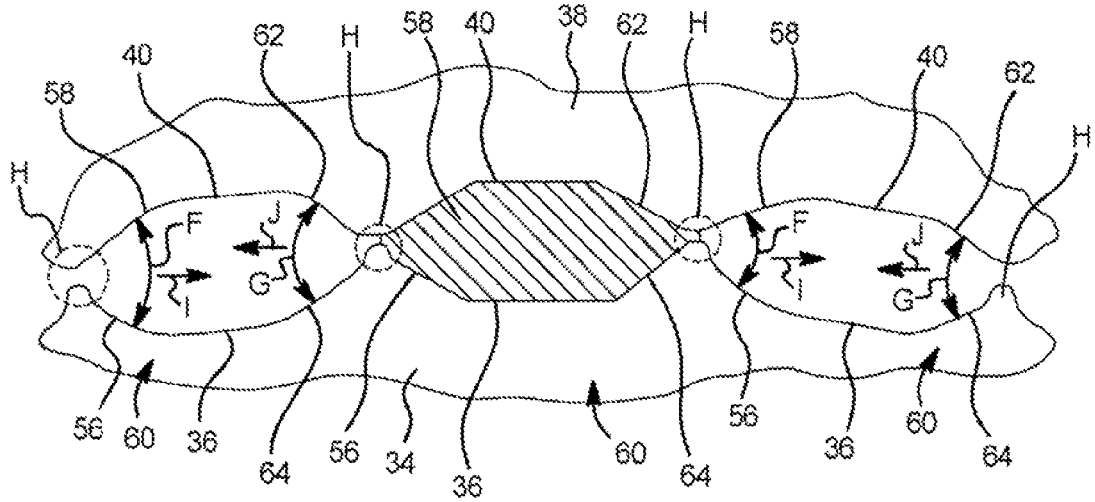
FIG. 4 is an enlarged elevation view of area 4 of FIG. 3.

In an embodiment, each first forming member 36 may have a first tapered surface portion 56 as shown in FIG. 4. Similarly, each second forming member 40 may have a second tapered surface portion 58. FIG. 4 is an enlarged view of area 4 of FIG. 3. Thus, FIG. 4 shows zones 6, 7, and 8. The dark region within the mated forming member 60 in zone 7 exemplifies rope 28. In an embodiment, one or both tapered surface portions 56, 58 may be planar, or otherwise substantially flat or flat. Full cooperative engagement of the first and second forming members 36, 40 forms or otherwise provides a mated forming member 60. In an embodiment, the cooperative engagement that occurs in zones 6, 7, and 8 may provide mated forming members 60 in one, some, or each of zones 6, 7, and 8. It is understood that mated forming members may occur in other zones as well.

The first and second tapered surface portions 56 and 58 of the mated forming member 60 may form an angle F. In an embodiment, angle F may have a size or a magnitude from about 60° to about 120°, or from about 66° to about 110°, or from about 70° to about 90°, or from about 75° to about 85°, or any magnitude or size therebetween.

In a further embodiment, each first forming member 36 may have a third tapered surface portion 64 and each second forming member 40 may have a fourth tapered surface portion 62. In an embodiment, one or both tapered surface portions 62, 64 may be planar or otherwise substantially flat or flat. Third and fourth tapered surface portions 64 and 62 may form an angle G. In an embodiment, angle G may have a size or magnitude from about 60° to about 120°, or about 66° to about 110°, or from about 70° to about 90°, or from about 75° to about 85°, or any size therebetween. In a further embodiment, angle F and angle G may have the same size or magnitude.

The tapered surface portions 56, 58, 62, 64 advantageously promote the sealing of individual chewing gum pieces 46. As first forming members 36 cooperatively engage and approach second forming members 40, first and second tapered surface portions 56 and 58 squeeze or otherwise push the fluid within the rope 28 away from crimping and sealing area H. In other words the shape of the tapered surface portions 56, 58 moves the fluid toward the center of the forming individual chewing gum piece 46 as shown by arrow I. Similarly, third and fourth tapered surface portions 62, 64 move the fluid in the rope 28 away from sealing area H and toward the center of forming individual chewing gum piece 46 as shown by arrow J. Thus, the tapered surface portions 56, 58, 62, and 64 move the fill fluid away from the sealing area (and into the center of the chewing gum piece) thereby providing more direct contact between opposing surfaces of the chewing gum material. By removing the fill fluid from the sealing area, the tapered surface portions 56, 58, 62, and 64 increase the available surface area for direct chewing gum-to-chewing gum contact between opposing sides of the rope 28, thereby promoting a stronger, longer lasting, more durable chewing gum seal.

Figure 5:
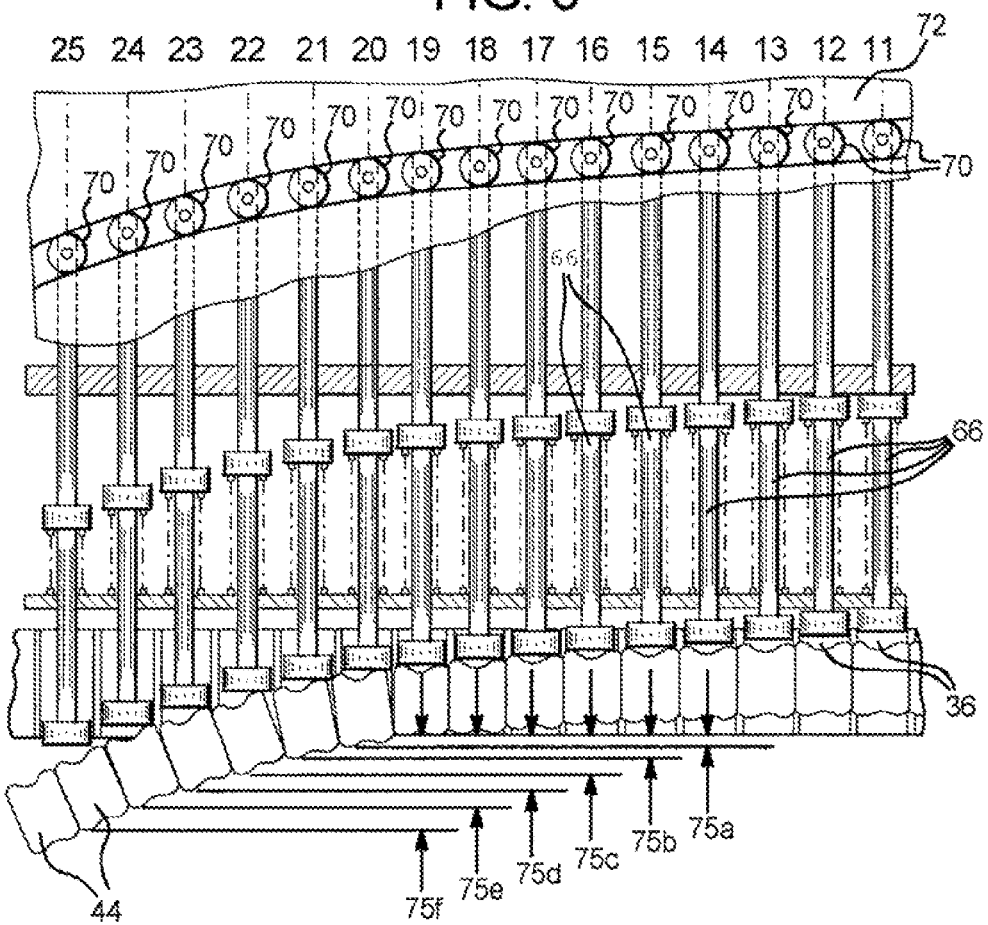
FIG. 5 is a schematic representation of a forming device of the present

In an embodiment, the first wheel 34 may include plunger members 66, wherein each plunger member 66 may correspond to each first forming member 36. FIG. 5 is a plan view of area C of FIG. 3, with the second wheel 38 removed to clearly illustrate the operation of the plunger members 66 within the first forming members 36. Zones 11-25 of FIG. 5 correspond to zones 11-25 of FIG. 3. Each of zones 11-25 may include a plunger member 66. The plunger members 66 may be biased (i.e., by way of a spring or a similar device) to default to a retracted position, such as, for example, the position of the plunger member 66 in zone 11.

A cam 72 having a cam profile may move the plunger members 66 into and out of the respective first forming members 36, as is commonly known in the art. In an embodiment, the plunger members 66 include rollers 70 that may traverse the cam profile when the rollers 70 contact the cam 72 during a revolution of the first wheel 34. As used herein, "cam profile" will be understood to mean the shape of the outer surface of the cam 72 upon which the rollers 70 traverse. In an embodiment, and as shown in FIG. 5, the cam 72 may gradually increase in thickness from a top of the cam 72 (i.e., corresponding to a location near zone 11) to a bottom of the cam 72 (i.e., corresponding to a location near zone 25). As the cam 72 gradually increases in thickness, the rollers 70 may traverse the cam profile such that the plunger members 66 are gradually pushed further into the first forming members 36 to contact the beaded rope 44 of chewing gum material to gradually push the beaded rope 44 out of the first forming members 36, as is shown by FIG. 5. In an embodiment, the cam 72 may be fixed at a location on the side of the forming device 18 having the plunger members 66. The cam 72 may also be fixed at a location that corresponds to from about zone 11 to about zone 25. In an embodiment, the cam 72 does not rotate with one of first and second wheels, 34, 38.

After the first and second forming members 36, 40 register and cooperatively engage to pinch, crimp, and seal portions of the rope 28 to form beaded rope 44, as previously described, the plunger members 66 may simultaneously move into the first forming members 36. In area C of FIG. 3, for example, the first and second forming members 36, 40 begin to disengage after forming the beaded rope 44. This disengagement occurs at a location at or about zone 11. Just prior to this stage in the forming process, the plunger members 66 are not in contact with the beaded rope 44. However, as the forming process proceeds, and at some point in the forming process corresponding to a location at about zone 11, the plunger member 66 begins to contact the beaded rope 44 to push the beaded rope 44 out of the first forming member 36, and, eventually, out of the plane in which first and second wheels 34, 38 rotate.

For example, as shown in FIG. 5, the plunger member 66 begins to contact the cam 72 at or about zone 11. At that time, the roller 70 of plunger member 66 begins to traverse the cam profile and gradually push the plunger member 66 further into the first forming member 36 as the roller 70 traverses the cam profile. By about zone 25, roller 70 has traversed substantially the entire length of the cam profile and has pushed the beaded rope 44 entirely out of the first forming member 36. It should be understood, however, that the cam profile is not limited to the shape shown in FIG. 5 and may have any shape desired or known in the art. As such, it should also be understood that the plunger members 66 need not push the beaded rope 44 entirely out of the first forming member 36, and may push the beaded rope 44 only a portion of the way out of the first forming member 36 as the plunger members 66 traverse the cam profile.

The inward movement of the plunger members 66 into the first forming members 36 may be halted at a predetermined distance and the plunger members 66 are, thereafter, brought back to a fully retracted position so that a new cycle may begin. As used herein, "cycle" refers to one revolution of the first wheel 34. The predetermined distance that the plunger members 66 are allowed to extend may include a distance that correlates to a position of the plunger member 66 after having pushed the beaded rope 44 entirely out of the first forming member 36. Similarly, the predetermined distance may include a distance that corresponds to from about one-half to about two times the length of the first forming member 36 that the plunger member 66 extends through. It should be understood, however, that the predetermined distance is not limited to the above-mentioned distances and may be determined based on a desired configuration of forming device 18.

As mentioned above, the plunger members 66 operate sequentially to push the beaded rope 44 out of the first forming members 36. As used herein, "sequential" movement of the plunger members 66 refers to the action of a first plunger member 66a with respect to an adjacent and following second plunger member 68b, as is shown, for example, in FIG. 6. Generally, with each cycle of the first wheel 34, each plunger member 66 experiences identical movement to the preceding plunger member 66 along the cam 72. After traversing the cam 72, each plunger member 66 may then retract to a starting position until the plunger member 66 begins to contact the cam 72 in a subsequent cycle. For example, during a cycle wherein the first wheel 34 rotates in a counter-clockwise direction, as shown in FIG. 6, a first plunger member 66a completes a full cycle just prior to an adjacent and subsequent second plunger member 66b.

The first plunger member 66a and second plunger member 66b may follow identical paths during the cycle, with the exception that the first and second plunger members 66a, 66b will be slightly out of phase by a predetermined amount. The predetermined amount that the first and second plunger members 66a, 66b are out of phase depends upon the number of the plunger members 66 and the first forming members 36 contained on the first wheel 34. For example, if the first wheel 34 includes thirty-six plunger members 66 and first forming members 36, the first and second plunger members 66a, 66b will be about 10° out of phase.

Similarly, because the plunger members 66 act sequentially upon the beaded rope 44 at any given time during the cycle when the plunger members 66 are contacting the cam 72, the first plunger member 66a may extended a first distance that is greater than a second distance extended by the second plunger member 66b, as is shown by FIGS. 5 and 6. For example, FIG. 5 demonstrates that at a given instant of time during the cycle of the first wheel 34, the plunger member 66 located in zone 23 is extended a greater distance than is the adjacent plunger member 66 located in zone 22. For instance, the plunger member 66 located in zone 23 is extended a first distance that is sufficient to push the beaded rope 44 out of the first forming member 36 a distance that is represented by the numeral 75d. Similarly, the plunger member 66 located in zone 22 is extended a second distance that is sufficient to push the beaded rope 44 out of the first forming member 36 a distance that is represented by the numeral 75c. Because the extension of the plunger members 66 corresponds to the distance the beaded rope 44 is pushed out of the first forming member 36, FIG. 5 clearly demonstrates that the first plunger member 66a may extend a distance that is greater than the second plunger member 66b. This concept is also illustrated in FIG. 6, which shows the plunger members 66a and 66b sequentially acting on the beaded rope 44.

The operation of the plunger members 66 preferably allows the beaded rope 44 to be removed, or pushed, out of the plane in which the first and second wheels 34, 38 rotate. By pushing the beaded rope 44 out of the plane of rotation, the risk of the beaded rope 44 colliding with the rope 28 (as the beaded rope 44 exits the forming device 18 and the rope 28 enters the forming device 18) is substantially reduced. Ensuring that the forming device 18 operates efficiently, without any collisions of chewing gum material upon entering and exiting the device, allows the forming device 18 to operate at high-volumes to cost-effectively manufacture chewing gum products. Moreover, the plunger members 66 act on the beaded rope 44 to allow for a "controlled fall" of the beaded rope 44 as it is pushed out of the first forming members 36. This controlled fall reduces the risk of damage to the beaded rope 44 and helps ensure that the beaded rope 44 does not separate into individual chewing gum pieces as it is removed from the forming device 18.

FIG. 6 provides a perspective view of the first wheel 34, the second wheel 38 and the relationship of the plunger members 66 with the first and second forming members 36, 40. FIG. 6 illustrates the motion of the chewing gum product within the forming device 18. For example, the rope 28 is shown entering the forming device 18 in front of the first and second wheels 34, 38. Upon entering the forming device 18, the rope 28 is pulled into the plane in which the first and second wheels 34, 38 rotate and into the first and second forming members 36, 40, which subsequently mate to form the beaded rope 44 at or about the top of the forming device 18, which corresponds to zones 0-11 of FIG. 3.

After the first and second forming members 36, 40 form the beaded rope 44, the first and second forming members 36, 40 begin to disengage at a location corresponding to a location at or about zone 11 of FIG. 3. This location is shown in FIG. 6 where the plunger members 66 begin to act on the beaded rope 44 to sequentially push the beaded rope 44 out of the plane in which the first and second wheels 34, 38 rotate. As the first wheel 34 continues to rotate counter-clockwise, for example, the plunger members 66 may continue to traverse the cam 72 (not shown) and to extend further into the first forming members 36 to push the beaded rope 44 out of the plane in which the first and second wheels 34, 38 rotate. The plunger members 66 stop acting on the beaded rope 44 at a location corresponding to a location at or about zone 25 in FIG. 3. At this stage in the forming process, and as shown by FIG. 6, the beaded rope 44 has been pushed entirely out of the plane in which the first and second wheels 34, 38 rotate. Therefore, as the beaded rope 44 exits the forming device 18, it exits in a second plane that forms an angle with the first plane in which the first and second wheels 34, 38 rotate. In an embodiment, the angle formed between the first plane and the second plane is greater than about 5° and less than about 90°. In another embodiment, the angle formed between the first plane and the second plane is greater than about 10° and less than about 90°.

Figure 7:
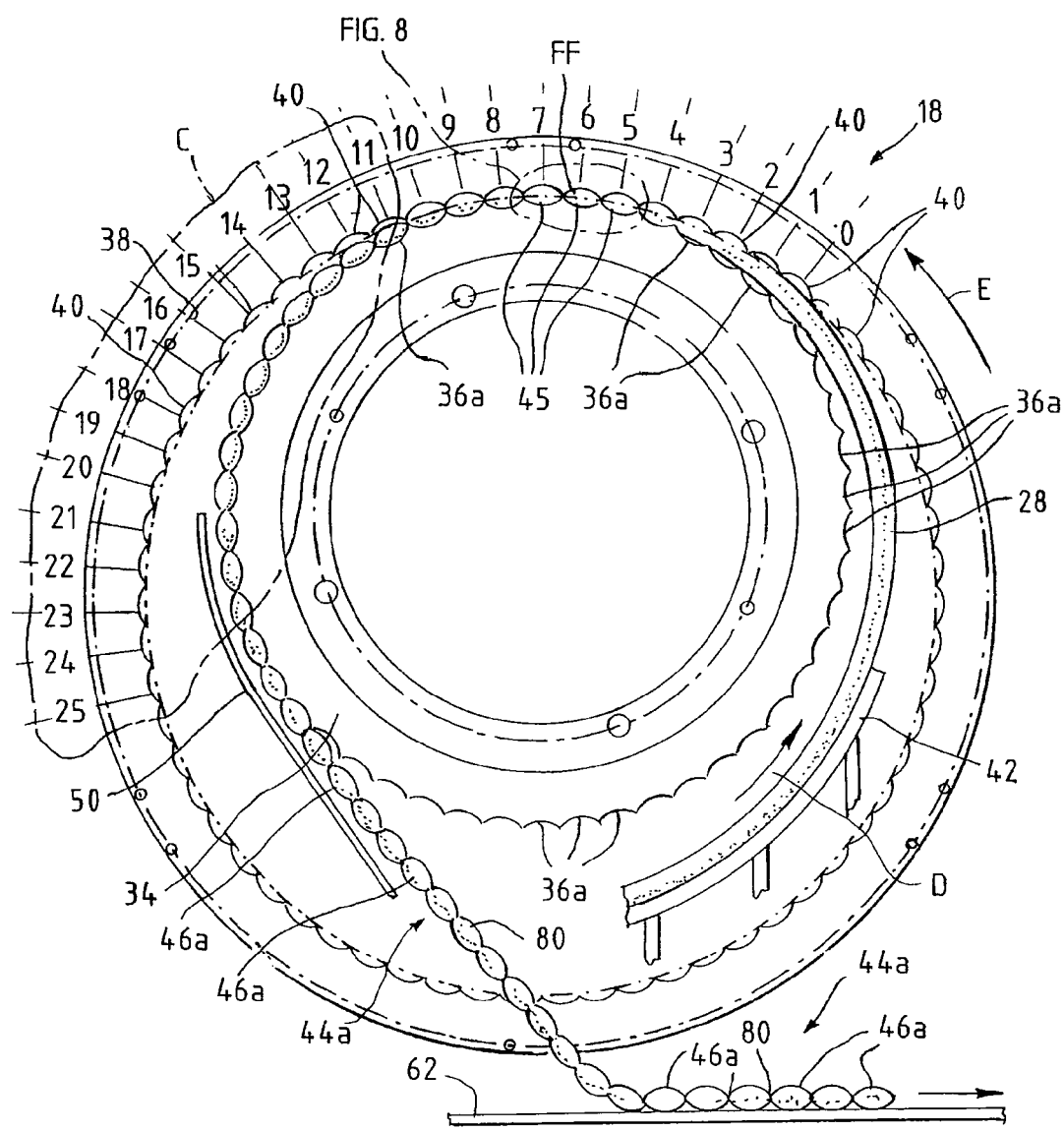
FIG. 7 is a side elevation view of a forming device of the present disclosure.

In an embodiment, the first forming members 36a have a first shape and the second forming members 40 have a second shape that is different than the first shape as shown in FIGS. 7-9. Cooperative engagement between the first and second forming members 36a, 40 occurs along an interface plane FF. Thus, when the first and second forming members 36a, 40 come into full cooperative engagement or are otherwise mated (in one, some, or each of zones 6, 7, and 8, for example), the forming members 36a, 40 form a chamber 45 that is asymmetrical along the length of the interface plane FF. In other words, the portion of the chamber 45 above the interface plane FF has a profile, a shape, an area, and/or a volume different than the profile, the shape, the area, and/or the volume of the portion of chamber 45 below the interface plane FF. This results in a center-filled chewing gum piece 46a having an asymmetrical shape that will be discussed in greater detail below.

It is understood that the area or space of each first forming member 36a is bounded by the forming surface on the outer circumference of the first wheel 34 and the interface plane FF. Similarly, the area or space of each second forming member 40 is bounded by the forming surface of the inner circumference of the second wheel 38 and the interface plane FF. The asymetry of the chamber 45 may result by altering or changing one or more characteristics of the first and second forming members 36a, 40 as desired. In an embodiment, each first forming member 36a may be formed to have a volume that is greater than the volume of each second forming member 40. Thus, when the rope 28 is placed and crimped between the first and second forming members 36a and 40, the amount the rope 28 present in each first forming member 36 is greater than the amount of the rope 28 present in each second forming member 40.

In an embodiment, each first forming member 36a may have a depth G and each second forming member 40 may have a depth H as shown in FIG. 8. FIG. 8 is an enlarged view of area 8 of FIG. 7. It is understood that the depth of each forming member 36a, 40 is the distance from the interface plane FF to the point on the forming member surface that is furthest from the interface plane FF. As is shown in FIG. 8, depth GG is greater than depth HH. The difference between depths GG and HH yields a chamber 45a that is asymmetric in shape along the interface plane FF. With this greater depth, each first forming member 36a is adapted to receive a greater amount of rope 28 than the second forming members 40 during the crimping and forming process. Accordingly, when the first and second wheels 34, 38 continue rotation and disengage the first forming members 36 from the second forming members 40 (i.e., approximately zones 9-13), one side of the sealed center-filled chewing gum piece 28a advantageously releases from the second forming members 40 while the other side of chewing gum piece 28a remains, clings, or otherwise is maintained in the first forming members 36a. The chewing gum piece 28a remains in the first forming members 36a because the shape of the first forming members 36a allows for a greater volume of the chewing gum piece 28a therein, therefore causing the chewing gum piece 28a to be more easily released from the second forming members 40. In an embodiment, release of the chewing gum piece 28a may be further promoted by blowing chilled air into or across the second forming members 40. The blast of chilled air may occur before, during or just after forming of the chewing gum piece 28a.

Further rotation of the first wheel 34 may cause the sealed center-filled chewing gum piece 28a to release or otherwise fall from the first forming members 36 by way of gravity. Thus, the provision of first forming members 36a with a greater depth than the depth of the second forming members 40, advantageously yields a forming device 18 that requires no ejection device such as a plunger device or similar device to remove the sealed center-filled chewing gum pieces 28a from the forming device.

In an embodiment, each first forming member 36b may have a contoured side portion 49a, 49b as shown in FIG. 9. The curve or profile of contoured side portion 49a may be the same or different as the curve or profile of the contoured side portion 49b. The curve of the contoured side portions 49a, 49b may be regular (i.e., sinusoidal for example) or irregular (i.e., wavy for example). The contoured side portions 49a, 49b may also include ridges or edges. The presence of one or both contoured side portions 49a, 49b may result in the first forming members 36b having a shape that is different than the shape of the second forming members 40 along the interface pane FF. Thus, when the first forming members 36b come into mated or cooperative engagement with the second forming members 40, a chamber 45b, which asymmetric in shape along the interface plane FF, is formed.

In an embodiment, the contoured side portions 49a, 49b cause the sealed chewing gum pieces 28b to remain in the first forming members 36b as the second forming members 40 disengage or otherwise rotate away from the first forming members 36b. The sealed chewing gum pieces 28b may be subsequently released from the first forming members 36b by way of gravity upon further rotation of the first wheel 34 as previously discussed.

The degree of curvature of the contoured side portions 49a, 49b may be seen by comparing the curve profile of the contoured side portions 49a, 49b to the curve profile of conventional first forming members (shown by phantom line 51) that are symmetrical to the second forming members 40. It has been surprisingly found that the provision of one or more contoured surfaces to each first forming member yields a surface to which the sealed center-filled chewing gum pieces 28b cling as the second forming members 40 pull away from the first forming members after piece formation. Thus, as the first and second wheels 34, 38 rotate to disengage or un-mate the first and second forming members 36b, 40, no, or substantially no, portion of the sealed center-filled chewing gum pieces 28b adhere or otherwise remain on or in the second forming members 40. Moreover, the surface contour of the first forming members 36b can further permit the sealed center-filled pieces 28b to release or otherwise fall freely by way of gravity from the first forming members 36b with further rotation of the first wheel 34.

In a further embodiment, the presence of the contoured side portions 49a, 49b may result in the first forming members 36b having a greater volume and/or a greater surface area than the volume and/or surface area of the second forming members 40. Consequently, a greater amount of the rope 28b may be present in each first forming member 36b having contoured side portions 49a, 49b when compared to the amount of rope present in each second forming member 40 during the forming process. It is understood that the first forming members 36a can include contoured side portions as herein described.

In an embodiment, each second forming member 40 may have one or more tapered portions 56, 58 as shown in FIGS. 8 and 9. In an embodiment, one or both tapered surface portions 56, 58 may be planar, or otherwise substantially flat or flat. In an embodiment, the first and second tapered surface portions 56, 58 may form respective angles II and JJ with the interface plane FF. The magnitude of angles II and JJ may be the same or different. In an embodiment, one or both angles II, JJ have a size or magnitude from about 30° to about 60°, or from about 36° to about 50°, or from about 45°, or any magnitude or size therebetween. The tapered portions 56, 58 advantageously promote ready release of the chewing gum rope from the second forming members 40 as the first and second wheels 34, 38 rotate to disengage the first and second forming members 36a, 40.

An embodiment of the present forming device without having an ejection device may have several advantages. The center-filled chewing gum rope 28 is tacky and sticky as it proceeds through the forming device 18. It has been surprisingly found that the configuration of the second forming members 40 in conjunction with the differently shaped first forming members 36a or 36b promotes the rope (or sealed center-filled chewing gum piece) to release from the second forming members while simultaneously remaining in the first forming members 36a, 36b as the first and second forming members disengage. Thus, the differently shaped first and second forming members 36, 40 may operate synergistically to ensure that all, or substantially all, of the center-filled chewing gum material continuously releases from the second forming members 40 while remaining in the first forming members 36 after the crimping and the sealing stages are complete. The releasability from the second forming members 40 is consistently reliable to the extent that an embodiment of the forming device 18 includes no ejection device or plunger members or similar removal device to remove the formed center-filled chewing gum product from the forming members 36. Releasability from the second forming member 40 may also be promoted by blowing chilled air into or across the second forming members 40. The blast of chilled air may occur before, during or just after crimping and sealing of the beaded rope 44. Thus, an advantage of an embodiment of the present forming device 18 is that it may not require any ejection device, plunger device, or plunger member, thereby saving money and inefficiency in high-volume product of center-filled products.

As embodiments of the forming device 18 may include either no plunger members, or plunger members on only one side of the forming device 18, it is possible to monitor the forming process. With conventional forming devices it is difficult and often impossible to monitor or observe the chewing gum product crimping, sealing, and forming process as the presence of plunger members on both sides of the forming device 18 obstruct and/or block the view of the forming members and forming chambers.

In an embodiment, a transparent panel may be placed along the side of the forming device 18 permitting visual inspection of the forming members 36a, 40 and the forming chambers during the crimping, sealing, and forming operation. The transparent panel may be releasably attached to the forming device 18 to allow for maintenance and care of the forming members 36, 40 and the wheels 34, 38. The panel may also protect the chewing gum rope and/or the chewing gum product from dirt or other contaminates. Nonlimiting examples of suitable materials for the transparent panel include glass, a transparent polymeric material, or polycarbonate.

In an embodiment, a temperature differential may be present between the first forming members 36 and the second forming members 40. The second wheel 38 may be configured to receive a cold fluid (i.e., a gas or a liquid) which may be introduced into or otherwise pass through (continuously or intermittently) the second wheel 38 and lower the temperature of the second forming members 40. Thus, the second forming members 38 may be at a lower temperature than the temperature of the first forming members 36, 36a, or 36b. The first wheel 34 may be configured to receive a cold fluid to chill or cool the first forming members 36, 36a, or 36b in an similar manner.

Returning to FIG. 7, continued rotation of the first and second wheels 34, 38, increases the distance between the first and the second forming members 36a, 40 to disengage the first forming members 36a from the second forming members 40. This results in the formation of a beaded rope 44a having a plurality of sealed center-filled chewing gum pieces 46a attached to each other as shown in zones 9-13. Beaded rope 44a includes a plurality of sealed and center-filled chewing gum pieces 46a attached to one another at crimp segments 80. It is understood that the zones 0-13 are for illustration purposes and that the pinching, crimping, and sealing forces imposed upon the rope 28 by the first and second forming members 36a, 40 may occur at one, some, or all of zones 0-13.

Further, it is understood that the zones 14-25 are for illustration purposes and that an ejection device may act at one, some, or all of zones 14-25.

Figure 10:
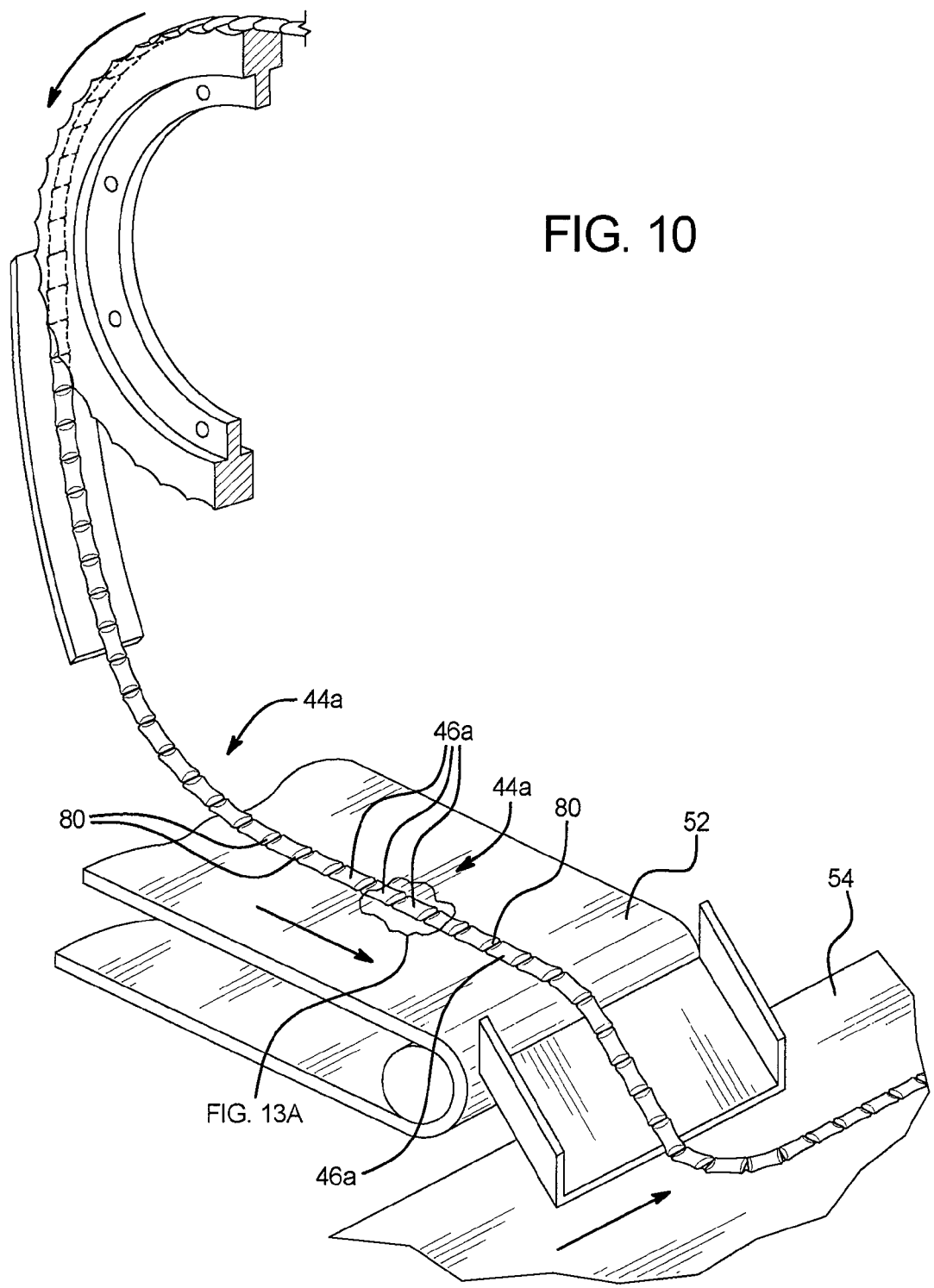
FIG. 10 is a perspective view of a forming device and a beaded rope of the present disclosure.

As the beaded rope 44a moves out of an area where the beaded rope 44a is pinched, crimped, and sealed, the beaded rope 44a is released from the second forming members 40 and remains in the first forming members 36a as discussed above. Continued rotation of the first wheel 34 allows gravity and the weight of the free-hanging portion of the beaded rope 44a to act upon the portion of beaded rope 44a still in the first forming members 36a. This enables the beaded rope 44a to be continuously released from the first forming members 36a. Once free from the first forming members, the beaded rope 44a may move into contact with a guide 50, as previously mentioned. The guide 50 supports and directs the beaded rope 44a onto a transport device 52 as shown in FIGS. 7 and 10. The transport device 52 (such as a conveyor) may transport or otherwise deliver the beaded rope 44a to the cooling chamber 20 and subsequently to a tempering device. FIG. 10 shows the beaded rope 44a leaving the first forming members 36a, the beaded rope 44a being received by the transport device 52. A second transport device 54 may receive the beaded rope 44 and transport the beaded rope 44a in a different direction.

As mentioned above, the beaded rope 44a may be removed from one or both of the first and second forming members 36a, 40, by an ejection device. The ejection device may be either a contact or a non-contact ejection device. As used herein, a "non-contact" ejection device is a device that can remove chewing gum material from a forming member 36 (or 36a, or 36b) and/or the forming members 40 without touching the chewing gum material. In an embodiment, the ejection device is a contact ejection device including plunger members, as previously described. Similar to the plunger members, the non-contact ejection device may be designed to sequentially push the chewing gum material out of a plane in which the first and second wheels 34, 38 rotate. The non-contact ejection device may also be designed to push the chewing gum material away from (i.e., out of contact with) the forming members 36 (or 36a, or 36b) and/or forming members 40 without touching the chewing gum material.

In an embodiment, the forming device 18 may include a non-contact ejection device that removes chewing gum material from the forming members 36 (or 36a, or 36b) and/or forming members 40 without touching the chewing gum material. The chewing gum material may include sealed center-filled chewing gum pieces, broken or damaged chewing gum pieces, portions of the chewing gum rope 28 (or 28a or 28b), and/or center-fill material that adheres to forming members 36 (36a, 36b) and/or 40. The non-contact ejection device may include a device for discharging a pressurized fluid from across, into, through, and/or from first forming member 36a (or 36 or 36b) and/or second forming member 40. Therefore, the non-contact ejection device may discharge a pressurized fluid in one of a direction that is parallel to the plane in which the first and second wheels 34, 38 rotate and a direction that is perpendicular to the plane in which the first and second wheels 34, 38 rotate.

Figure 11:
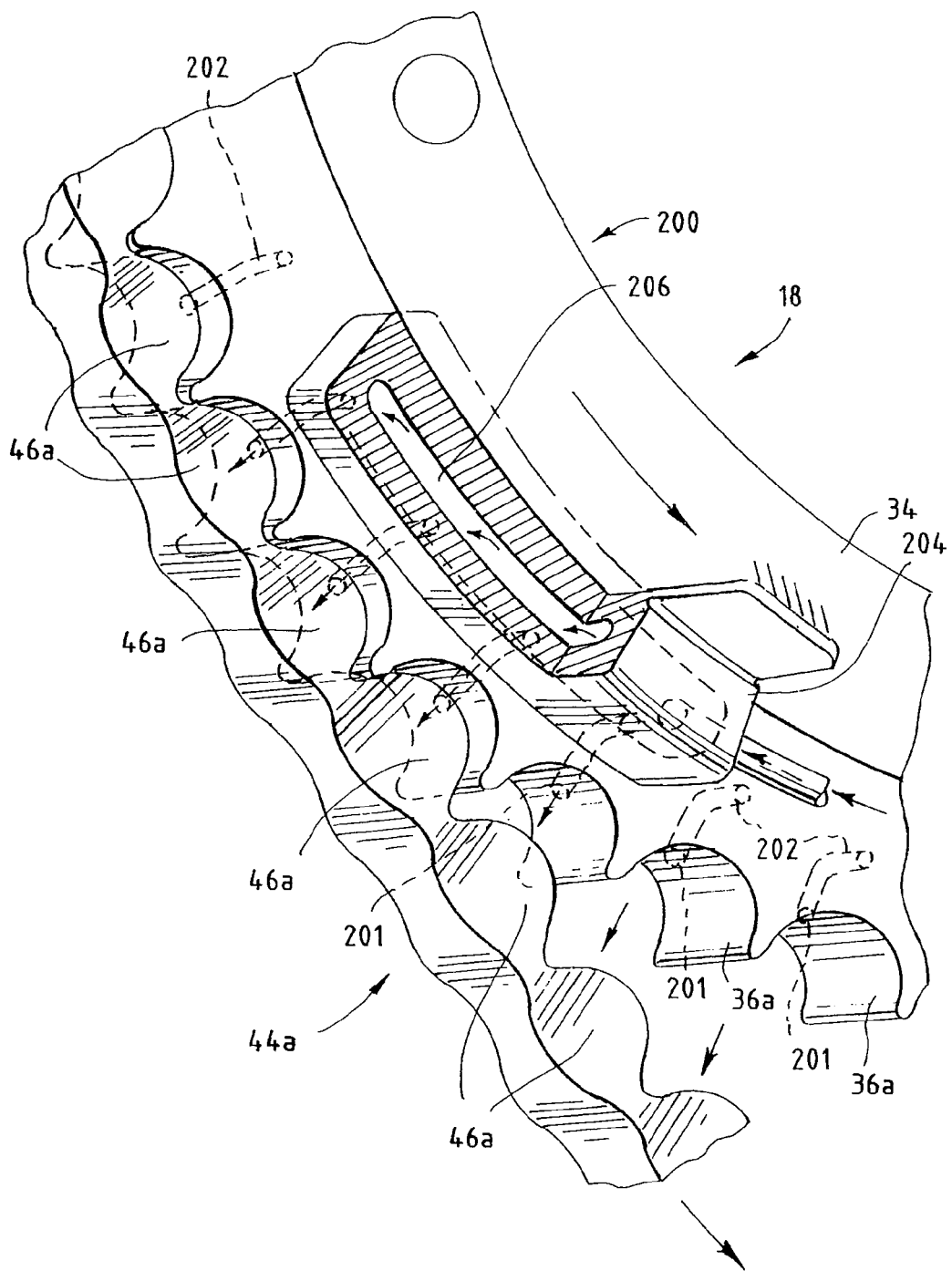
FIG. 11 is a fragmentary perspective view of a forming device of the present disclosure.

In an embodiment, a non-contact ejection device 200 is provided and includes a source of a pressurized fluid in fluid communication with an opening located in at least one of the forming members 36a, 40. FIG. 11 shows the first forming member 36a with an opening 201. It is understood that each forming member 36a may include an opening 201. It is further understood that any first forming member (36, 36a, 36b) as described herein may include the opening 201. Each second forming member 40 may have an opening 201 in a similar manner. The opening 201 may be used to discharge a flow of pressurized fluid, such as a jet of air or a similar gas, to assist in the release of the sealed center-filled chewing gum piece 46a from one or both forming members 36a, 40. The opening 201 may have a diameter from about 0.5 mm to about 2.0 mm or any value therebetween. In an embodiment, the opening 200 has a diameter of about 1.5 mm.

In an embodiment, the first wheel 34 may include a conduit 202 which extends through a portion of the body of the first wheel 34, the conduit 202 placing the opening 201 in fluid communication with a source of pressurized fluid 204. The first wheel 34 may be configured such that a respective conduit 202 is in fluid communication with each opening 201. The source 204 of the pressurized fluid may include an outlet 206. The source 204 may be located proximate to or otherwise adjacent to the first wheel 34. In other words, the source 204 is in fluid communication with the outlet 206.

After formation of the sealed center-filled chewing gum piece 46a, the first wheel 34 may rotate to place the conduit 202 in fluid communication with the outlet 206 as shown in FIG. 11. The source 204 generates a pressurized or compressed fluid which passes through conduit 202 and flows from the opening 201. This pressurized flow or jet of fluid discharges the sealed center-filled chewing gum piece 46a from the first forming member 36a. It is understood that the sealed center-filled chewing gum piece 46a may fall freely from the first forming member 36a by way of simple gravity as discussed above. The pressurized flow of fluid emitted from the opening 201 may be used to release the sealed center-filled chewing gum piece 46a alone or in addition to gravity. In this way, it is assured that the sealed center-filled chewing gum piece 46a will not adhere to the first forming member 36 (or to the second forming member 40). Nonlimiting examples of suitable pressurized fluid include liquids such as water and food-acceptable oils and gasses such as air, nitrogen, and argon. The gas may be compressed and/or chilled or cooled to further promote release of the sealed center-filled chewing gum piece 46a from the first forming member 36a.

In an embodiment, the outlet 206 may be configured such that the pressurized fluid is ejected from the opening 201 while the first wheel 34 continues to rotate. The outlet 206 may have an extended length as shown in FIG. 11. The first wheel 34 rotates to place the conduit 202 in fluid communication with the outlet 206. As the first wheel 34 continues to rotate, each conduit 202 moves along the outlet 206. Pressurized fluid passes through the outlet 206, through each conduit 202, and through the openings 201 as long as fluid communication is maintained between the each conduit 202 and the outlet 206. Thus, the pressurized fluid may be discharged in a direction that is substantially parallel to the plane in which the first and second wheels 34, 38 rotate. Continued rotation of the first wheel 34 eventually moves each conduit 202 out of fluid communication with the outlet 206, halting the flow of the pressurized fluid from the opening 201. It is understood that the second wheel 38 and second forming members 40 may be configured with openings, conduits, and a fluid source in a similar manner.

In an embodiment, the fluid source 204 may be a vortex compressor or similar device. A vortex compressor rotates a gas at high speed, separating the gas into hot and cold streams as is commonly known in the art. A vortex compressor may be used to generate a pressurized stream of gas (i.e., air) with a temperature from about 10° C. to about −50° C. or any temperature therebetween. Thus, the pressurized fluid of the non-contact ejection device may have a temperature from about 10° C. to about −50° C. or any temperature therebetween.

Figure 12:
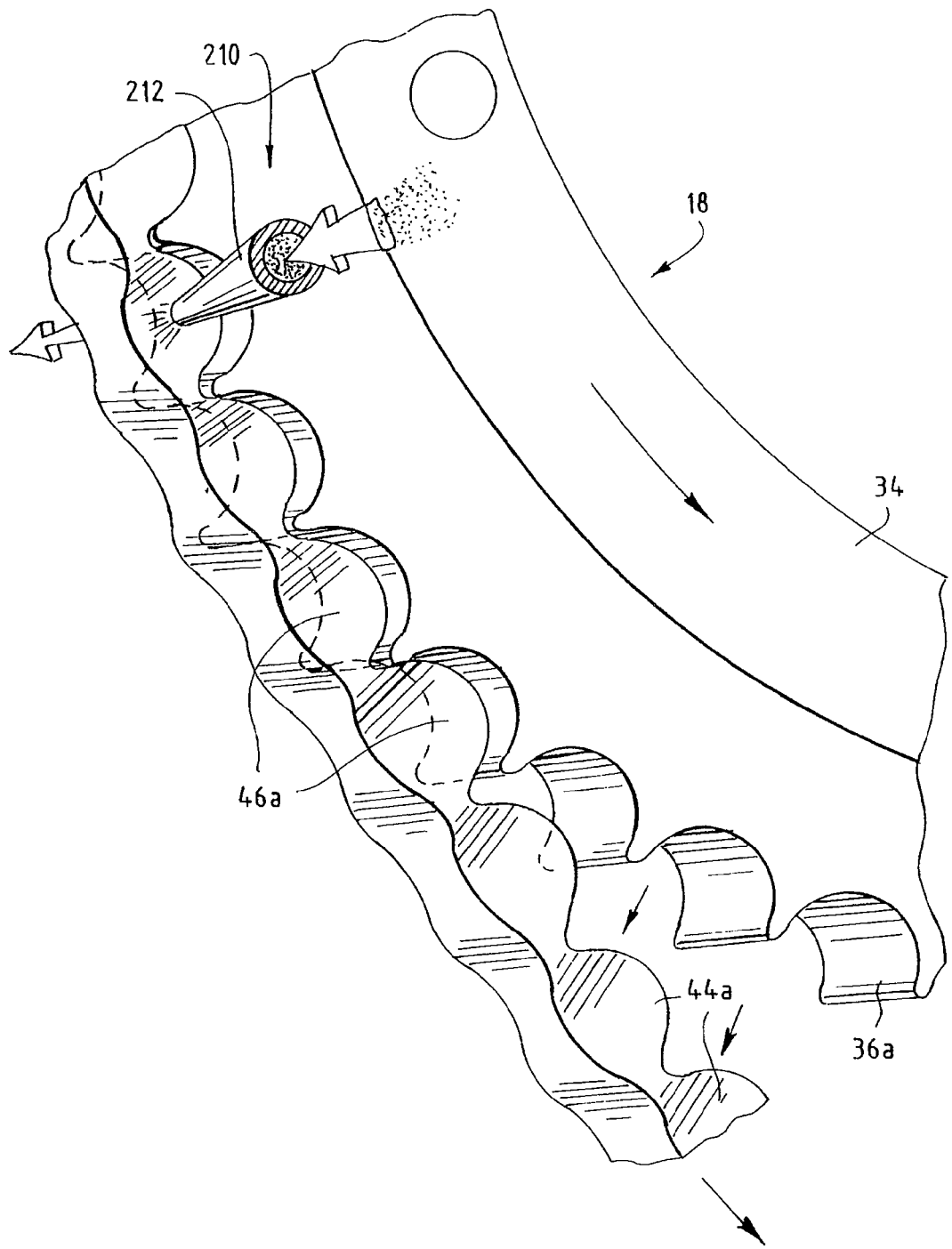
FIG. 12 fragmentary perspective view of a forming device of the present disclosure.

In an embodiment, the forming device 18 may include a non-contact ejection device 210 as shown in FIG. 12. The non-contact ejection device 210 may include a nozzle 212 proximate to at least one of the forming members, the nozzle 212 in fluid communication with a source (not shown) of a pressurized fluid. The ejection device 210 may be located alongside the first wheel 34 so as to position the nozzle 212 adjacent to the first forming members 36a (or 36, 36b). As the first and second wheels 34, 38 rotate to disengage the first and second forming members 36a, 40 after formation of the fluid filled chewing gum piece 46a, the nozzle 212 blows, ejects, or jets a pressurized fluid across, through or into each passing first forming member 36a. This blast of pressurized fluid across the forming member 36a can eject the fluid filled chewing gum piece 46a from the first forming member 36a in a direction that is substantially perpendicular to the plane in which the first and second wheels 34, 38 rotate. The pressurized fluid may be any fluid as discussed above. In an embodiment, the pressurized fluid from the nozzle 212 may be a cooled or super-cooled gas ejected under pressure and source of the pressurized fluid may be a vortex compressor as discussed above. The nozzle 212 may be located next to the second forming members 40 to eject the fluid filled chewing gum piece from the second forming members 40 in a similar manner. The pressure of the pressurized fluid ejected from the nozzle 212 may be adjusted so that the pressurized fluid does not change or otherwise alter the shape of the sealed fluid filled chewing gum piece 46a (or 46).

In an embodiment, the ejection device 210 may include a plurality of nozzles 212. A first nozzle may be positioned alongside the first forming members 36a (or 36, 36b). A second nozzle may be positioned alongside the second forming members 40. In this way, it is ensured that no chewing gum material adheres to the forming members 36a, 40 after the crimping, sealing and forming process is complete.

In an embodiment, multiple nozzles 212 may be placed along either the first forming members 36a (36, 36b) and/or along side the second forming members 40. The pressure of the fluid ejected from the nozzle 212 may be adjusted to ensure that the fluid filled chewing gum pieces leave the forming members as the beaded rope. Alternatively, the fluid pressure may be adjusted so that the force of the fluid pressure across, into and/or through the forming member(s) separates the individual fluid filled chewing gum pieces 46a (or 46) from each other as they exit the forming device 18.

Figure 13A:
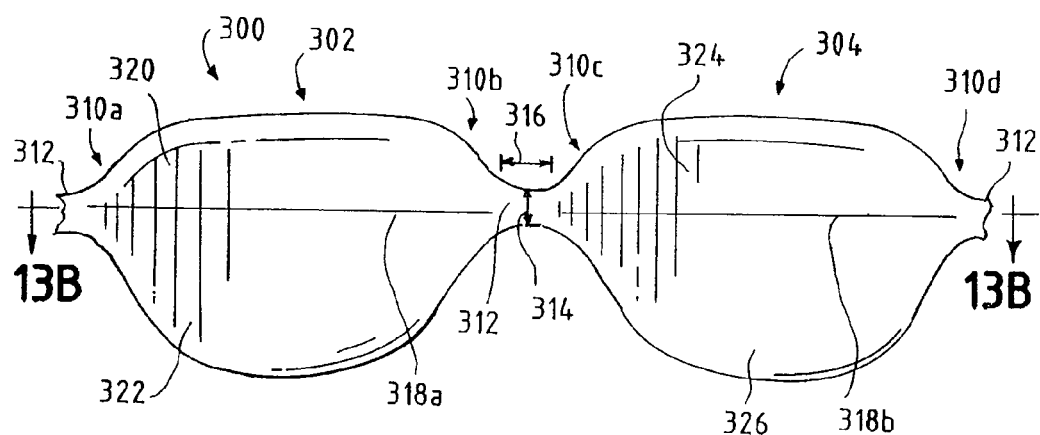
FIG. 13A is an enlarged elevation view of an embodiment of area 13A of FIG. 10.
Figure 13B:
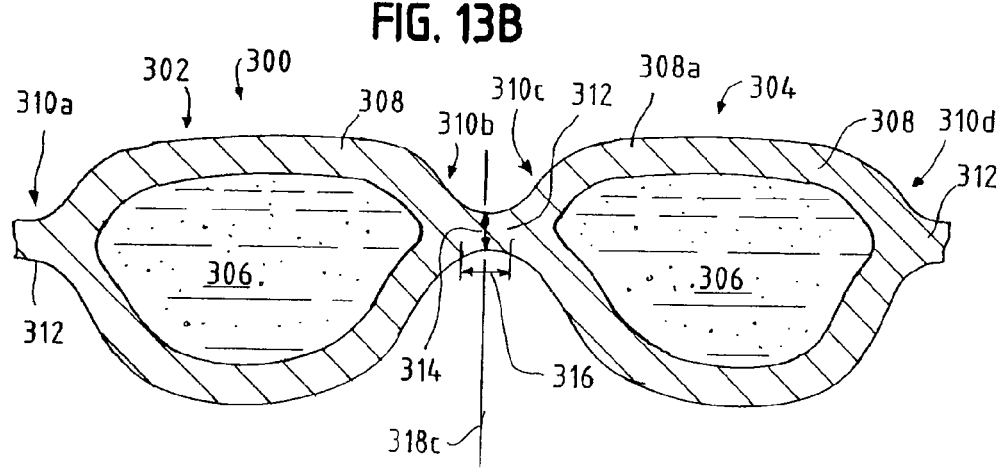
FIG. 13B is a sectional view taken along line 13B-13B of FIG. 13A.

In an embodiment, a chewing gum product 300 is provided as shown in FIGS. 13A and 13B. FIG. 13A is an enlarged elevation view of area 13A of FIG. 10. It is understood that chewing gum product 300 may include some, all, or part of beaded rope 44a. The chewing gum product 300 may be an intermediate product or a finished product. The chewing gum product 300 includes a first piece 302 and a second piece 304, each piece having respective center-fill portions and respective outer portions 308a, 308b as shown in FIGS. 13A and 13B. The center-fill portions 306a, 306b and the outer portions 308a, 308b respectively correspond to the center-fill portion and the outer portion of the rope 28. Each piece 302, 304 may have sealed ends 310a, 310b (for piece 302) and sealed ends 310c and 310d (for piece 304). A land 312 attaches or otherwise connects sealed end 310b of the first piece 302 with the sealed end 310c of the second piece 304. It is understood that the beaded rope 44 may include lands in a similar manner.

The land 312 is formed as a result of the cooperative engagement of the first and second forming members 36a, 40 as discussed above. The crimping pressure imposed upon the rope 28a when the first and second forming members 36a, 40 are in full cooperative engagement seals each piece 302, 304 and forms the land 312. Thus, the land 312 includes, or is an extension of, the outer portions 308a, 308b. In an embodiment, the land 312 includes only the outer portion 308a and/or 308b, with no, or substantially no, fill material present in the crimp segment 312.

In an embodiment, the land 312 has a thickness 314. The thickness 314 may be constant or may vary along a length 316 of the land. The thickness 314 may have a length from about 0.05 mm to about 0.25 mm or any value therebetween. In an embodiment, the thickness may be from about 0.1 mm to about 0.2 mm. The length 316 may be from about 0.05 mm to about 2.0 mm or any value therebetween. In an embodiment, the length 316 may be from about 0.5 mm to about 1.0 mm.

The land 312 may be made of any material from which the outer portion of the rope 28 is made as discussed herein. In an embodiment, the land 312 is chewing gum. In a further embodiment, the land 312 may be solely chewing gum. In other words, the center-fill material is absent or wholly absent in the land 312 as shown in FIG. 13B.

In an embodiment, a plane 318a extends through the sealed ends 310a and 310b of the first piece 302. A plane 318b extends through the sealed ends 310c and 310d of the second piece 304 in a similar manner. In an embodiment, the first piece 302 may be asymmetrical along the plane 318a. In other words, upper portion 320 of piece 302 located above the plane 318a differs in size, shape, and/or volume when compared to the size, shape, and/or volume of the lower portion 322 of the piece 302. It is understood that the first piece 302 is present on both sides of the plane 318a. Similarly, the second piece 304 has an upper portion 324 which is asymmetrical to lower a portion 326 along the plane 318b. The second piece 304 thereby is present on both sides of the plane 318b. As the land 312 imparts flexibility to the chewing gum product 300, it is understood that planes 318a, 318b may or may not be coplanar, parallel, intersecting, and/or skewed.

In an embodiment, a plane 318c extends through the land 312 as shown in FIG. 13B. The plane 318c is substantially normal to, or normal to, the land 312. The first piece 302 is symmetrical to, or substantially symmetrical to, the second piece 304. In other words, with the plane 318c as the reference plane, the first piece 302 is substantially a mirror-image, or a mirror-image, to the second piece 304. In an embodiment, the plane 318c may be a plane of symmetry with respect to the first piece 302 and the second piece 304. Thus, the shape, size and configuration of the first piece 302 and the second piece 308 is identical or substantially identical.

Similar to the rope 44a, the chewing gum product 300 may have the form of a rope and include a plurality of sealed center-filled pieces, adjacent pieces being attached to each other at the sealed ends by way of lands located between sealed ends of adjacent pieces. Thus, chewing gum product 300 may emerge from the forming device 18 as a continuous, unitary, bead-like or "rosary-like" strand.

The chewing gum product 300 (as well as the beaded rope 44a) carries many advantages. The attachment of adjacent sealed center-filled pieces by way of the lands 312 enables the chewing gum product 300 to move through and from the forming members 36a, 40 as a unitary mass as opposed to discrete individual center-filled pieces. This bead-like or rosary-like configuration of the chewing gum product 300 protects the individual sealed pieces during production. The first piece 302, the second piece 304, and the land 312 form an integral chewing gum product 300 which increases the mass of the chewing gum product 300 thereby increasing the gravitational pull on the chewing gum product 300 and promoting the release and/or separation of the chewing gum product 300 from the forming members 36a, 40 solely by way of gravity and without an ejection device. As mentioned previously, however, the forming device 18 may also utilize an ejection device. The unitary and integral structure of the chewing gum product 300 imparts durability and flexibility to the chewing gum product 300 enabling high speed production of the chewing gum product. Chewing gum product 300 more readily moves between processing stations when compared to individual pieces exiting the forming device 18 as discrete and separate formed chewing gum pieces. The unitary mass of the chewing gum product 300 yields more control of the product 300 upon leaving the forming device 18 and upon transport devices compared to individual pieces coming from the forming device. The lands 312 provide the chewing gum product 300 with flexibility to absorb processing forces to keep the chewing gum product 300 intact. If desired, the chewing gum product 300 may be broken into individual center-filled chewing gum product by way of tumbling, a vibration belt, or the like. It is understood that the beaded rope formed by way of forming members 36a, 40 carries similar advantages.

In an embodiment, the individual chewing gum pieces 46 of beaded rope 44 may be separated from each other to form a plurality of chewing gum products such as chewing gum product 90 as shown in FIGS. 14-17. The chewing gum product 90 may include a fluid center 92, an outer portion 94, and first and second ends 96 and 98. In an embodiment, ends 96 and 98 may be sealed ends, sealed as a result of the forming process performed by forming device 18 as previously discussed. A plane M may extend through the chewing gum product 90 as shown in FIG. 15. In an embodiment, the plane M may bisect the body to define an upper portion 100 and a lower portion 102, the upper and lower portions 100, 102 being equal or substantially equal in size and shape. In an embodiment, the upper and lower body portions 100, 102 may be mirror-images of each other. In a further embodiment, the plane M may extend through first and second ends 96 and 98.

In an embodiment, the chewing gum product 90 may include a tapered portion (or first tapered portion) 104 that extends to an upper surface 106. The first tapered portion 104 may intersect plane M to form an angle N. In an embodiment, the first tapered portion 104 may be planar or otherwise substantially flat or flat. In yet a further embodiment, the tapered portion 104 may intersect the plane M at first end 96. Angle N may have a size from about 30° to about 60°, or from about 33° to about 55°, or from about 33° to about or from about 35° to about 40°, or any size therebetween.

In an embodiment, the upper surface 106 may be located at a middle section of the chewing gum product 90 as shown in FIG. 15. In an embodiment, the upper surface 106 may be an uppermost surface of the chewing gum product. In yet a further embodiment, the upper surface 106 may include a planar portion 108 (or a flat portion), that is substantially parallel to, or parallel to, the plane M.

In an embodiment, the chewing gum product 90 may include an upper circumference O extending from the first end 96 to the second 98 along the upper surface of the chewing gum product. Although upper circumference O is shown as a straight line in FIG. 8, it is understood the upper circumference O extends along the upper surface of the product and may not necessarily be a straight line. The first tapered portion 104 may have a length that is at least 25%, or from about 25% to about 35% the length of the upper circumference O.

In an embodiment, the chewing gum product 90 may include a first side 108 and a second side 110. First and second ends 96, 98 and first and second sides 108, 110 may form a perimeter P as best seen in the plan view of the chewing gum product provided by FIG. 17. The first and second sides 108, 110 may have respective inwardly curved portions 112 and 114. The inwardly curved portions 112, 114 may provide the perimeter P with an hour-glass shape or a dog-bone shape or otherwise a concave shape. In an embodiment, the chewing gum product 90 may have a width ratio from about 65% to about 85%, or any value therebetween. In a further embodiment, the width ratio may be from about 70% to about 83%, or from about 75% to about 80%, or from about 76% to about 79%. The width ratio is calculated by determining the minimum width of the chewing gum product 90, distance T of FIG. 17, and dividing this value by the maximum width of the chewing gum product, distance U of FIG. 17. The minimum width (or T) of the chewing gum product 90 may typically be the distance between the innermost portions of the inwardly curved side portions 112, 114. The maximum width (or U) of the chewing gum product 90 may typically be the distance between an end on one side and an opposing second end located on the other side of the chewing gum product 90 (i.e., the distance or length between end 118 and end 120).

Table 1 below sets forth non-limiting examples of dimensions for the chewing gum product 90.

TABLE 1

| Fluid-filled chewing gum product | Width Center (mm) (minimum width) | Width End (mm) (maximum width) | Length (mm) | Width Ratio |
| --- | --- | --- | --- | --- |
| Uncoated | 12.2 | 15.2 | 18.1 | 80% |
| Coated | 13.1 | 16.4 | 19.3 | 80% |

In a further embodiment, the chewing gum product 90 may have a pillow shape as shown in FIGS. 14 and 17, for example.

In an embodiment, the chewing gum product 90 may have edges 116, 118, 120, and 122. The edges 116-122 may be rounded or otherwise curved. The rounded edges 116-122 advantageously promote uniform coating of the chewing gum product. In addition the rounded edges 116-122 reduce the amount of chipping experienced by chewing gum product during processing and/or handling.

In an embodiment, the fluid center 92 may be any fluid or flowable material as discussed herein. Nonlimiting examples of suitable compositions for the fluid center 92 include a liquid, a semi-liquid, a gel, a paste, a semi-solid, a flowable solid, and combinations thereof. In a further embodiment, the outer portion 94 may be any chewing gum material as discussed herein. In yet a further embodiment, the fluid center 92 may be a flavored syrup and the outer portion 94 may be a chewing gum. In an embodiment, the fluid center may be from about 5% to about 25% by weight, or from about 10% to about 15% by weight of the chewing gum product.

In an embodiment, the chewing gum product 90 may include a coating. The coating may include any suitable coating material such as, for example, sugars, polyols, or combinations thereof to form a crystalline or glassy coating. The sugars or polyols may be, for example, a component of a syrup or spray that is applied to form the coating. The coating may include a sweetener, a flavorant, a film forming agent, a colorant, a sensation producing ingredient, and combinations thereof. The sweetener for the coating may be sugar, sugar-based, or sugar-free. Non-limiting examples of suitable sweeteners include, maltitol, sorbitol, erythritol, mannitol, isomalt, lactitol, xylitol and combinations thereof. High intensity sweeteners may also be utilized in the coating. In an embodiment, the coating may be present in an amount of from about 10% to about 50% by weight, or from about 25% to about 35% by weight, or any value therebetween of the chewing gum product 90. Nonlimiting examples of suitable sensation producing ingredient may include a cooling agent, a food grade acid, a flavorant, and combinations thereof. The coating may be a hard, shiny, outer-shell coating. The coating made include sugar or may be sugarless. The coating may be applied in numerous thin layers of material in order to form an appropriate uniform coating. The coating materials may be applied to the chewing gum product 90 in liquid and/or in powder (or dry charge) form, in an alternating manner as is commonly known in the art.

In an embodiment, the coating may be achieved by using two coating syrups, one syrup with a Brix value from about 70% to about 73% and a second syrup having a Brix value from about 69% to about 71.5%. This coating syrup combination has advantageously been found to provide a uniform or substantially uniform coating about the entire outer surface of the chewing gum product 90, including rounded edges 116-122. These two syrups are thinner in consistency than standard coating syrup combinations which typically utilize a first syrup with a Brix value of about 73.5% and a second syrup with a Brix value of about 72%. In a further embodiment, coating process parameters such as air temperatures, pan rotation rate, alternating dry (or powder) and syrup additions, and pause times may be adjusted to produce a desired coating appearance as is commonly known in the art.

In an embodiment, the amount of liquid coating material and dry coating material may be reduced from about 5% to about 10% when compared to the amounts of liquid and dry coating material used in conventional coating processes.

In an embodiment, the size or the amount of the powder shots (i.e., the dry charges) may be reduced at each coating material addition stage as the coating process progresses. For example, a coating process having fifteen addition stages may begin by adding about 6.5 kg dry coating material (or powder) to individual chewing gum pieces 90 in a coating device. This amount may be decreased at each subsequent addition stage to a final addition of dry coating material in the amount of about 1.8 kg. In an embodiment, substantially no, or no, dry coating material may be added at the later addition stages—with only liquid coating material being added at the later addition stages. This gradual reduction in the amount of dry charge added during the coating process may advantageously be used to apply a uniform coating over the hour-glass shaped and/or the pillow-shaped chewing gum product 90.

In a further embodiment, the drying temperature may be increased as the coating process progresses. For example, a starting drying temperature of about 26° C. may be increased to a temperature of about 33° C. during as the coating process proceeds. In an embodiment, the drying temperature may not exceed 33° C. This drying temperature may be lower than drying temperatures applied in conventional coating processes, which is typically about 40° C.

In an embodiment, the chewing gum product 90 has a weight from about 1.8 grams to about 2.4 grams, or about 2.2 grams, or any weight therebetween. The weight may or may not include the weight of the coating.

In an embodiment, the chewing gum product 90 may include a second tapered portion 124 extending from the first end 96 to a lower surface 126. The first tapered portion 104 and the second tapered portion 124 may form an angle Q as shown in FIG. 15. Angle Q may have a magnitude from about 60° to about 120°, or from about 66° to about 110°, or from about 70° to about 90°, or from about 75° to about 85°, or any magnitude therebetween.

In an embodiment, the lower surface 126 may be located at a middle section of the chewing gum product 90 as shown in FIG. 15. In an embodiment, the lower surface 126 may be a lowermost surface of the chewing gum product 90. In yet a further embodiment, the lower surface 126 may include a planar portion 128 (or a flat portion), that is substantially parallel to, or parallel to, the plane M.

In an embodiment, the chewing gum product 90 may include a third tapered portion 130 extending from the second end 98 to the upper surface 106 and a fourth tapered portion 132 extending from the second end 98 to the lower surface 126. The third and fourth tapered portions 130, 132 may form an angle R as shown in FIG. 15. Angle R may have a magnitude from about 60° to about 120°, or from about 66° to about 110°, or from about 70° to about 90°, or from about 75° to about 85°, or any magnitude therebetween. In an embodiment, angle Q and angle R may have different magnitudes. In a further embodiment, angle Q and angle R may have the same, or substantially the same, magnitude.

In an embodiment, first tapered portion 104 and the third tapered portion 130 may have a combined length that is at least about 50% of the length of the upper circumference O. In a further embodiment, the second tapered portion 124 and the fourth tapered portion 132 may have a combined length that is at least 50% of the length of the lower circumference S.

In an embodiment, each of the tapered portions 104, 124, 130, 132 may have a surface area that may be from about 8% to about 40% of the overall surface area of the upper/lower portion 100, 102 upon which the tapered portion is located. For example, the first tapered portion 104 may have a surface area that may be from about 8% to about 40% of the total surface area of upper portion 100. In an embodiment, the combined surface areas of the first and third tapered portions 104, 130 may be from about 10% to about 80%, or from about 15% to about 75%, or from about 18% to about 20% (or any value therebetween) of the total surface area of the upper portion 100. In a further embodiment, the combined surface area of the first and third tapered portions 104, 130 maybe about 19% of the total surface area of the upper portion 100.

In a further embodiment, the combined surface areas of the second and the fourth tapered portions 124, 132 may be from about 10% to about 80% (or any value therebetween) of the entire surface area of the lower portion 102. In an embodiment, the combined surface areas of the second and fourth tapered portions 124, 132 may be from about 10% to about 80%, or from about 15% to about 75%, or from about 18% to about 20% (or any value therebetween) of the total surface area of the lower portion 102. In a further embodiment, the combined surface area of the second and fourth tapered portions 124, 132 may be about 19% of the total surface area of the lower portion 102.

In an embodiment, the individual chewing gum pieces 46a of beaded rope 44a may be separated from each other at the crimp segments 80 (or separated at lands 312) to form a plurality of chewing gum products such as chewing gum product 400 as shown in FIGS. 18-22. The chewing gum product 400 may include a body 402 having an inner portion 404, an outer portion 406, and first and second ends 408 and 410. In an embodiment, ends 408 and 410 may be sealed ends, sealed as a result of the forming process performed by forming device 18 as previously discussed. A plane MM may extend between or through the ends 408, 410 and through the chewing gum product 400 as shown in FIG. 19. In an embodiment, the plane MM may divide the body 402 to define an upper portion 412 and a lower portion 414. As can be seen in FIG. 19, the upper portion 412 is different in shape when compared to the shape of the lower portion 414. This difference in shape between portions 412, 414 results in the body 402 being asymmetrical along the plane MM. In other words, upper and lower portions 412, 414 are not mirror images of each other with respect to plane MM. Thus, the plane MM divides the body 402 into unequal portions, giving the body 402 a shape which is not symmetrical or a shape that is not equal on both sides of the plane MM. It is understood that portions of the chewing gum product 400 are present on both sides of the plane MM.

In an embodiment, the chewing gum product 400 may include a tapered portion (or first tapered portion) 416 that extends to an upper surface 420. The first tapered portion 416 may intersect plane MM to form an angle NN. In an embodiment, the first tapered portion 416 may be planar or otherwise substantially flat or flat. In yet a further embodiment, the tapered portion 416 may intersect the plane MM at first sealed end 408. Angle NN may have a size from about 30° to about 60°, or from about 33° to about 55°, or from about 33° to about 45°, or from about 35° to about 40°, or any size therebetween.

In an embodiment, the chewing gum product 400 may include a second tapered portion 418 that extends from the second end 410 to the upper surface 420. The second tapered portion 418 may intersect the plane MM to form an angle OO. In an embodiment, the second tapered portion may be planar or otherwise substantially flat. The magnitude of the angle OO may be the same or different from the magnitude of the angle NN. In an embodiment, the angle OO may have a magnitude from about 30° to about 60°, or from about 33° to about 55°, or from about 33° to about 45°, or from about 35° to about 40°, or any size therebetween. In a further embodiment, angles NN and OO have the same magnitude.

In an embodiment, the upper surface 420 may be located at a middle section of the chewing gum product 400 as shown in FIG. 20. In an embodiment, the upper surface 420 may be an uppermost surface of the chewing gum product 400. In yet a further embodiment, the upper surface 420 may include a planar portion 424 (or a flat portion), that is substantially parallel to, or parallel to, the plane MM.

In an embodiment, the chewing gum product 400 may include an upper circumference QQ extending from the first end 408 to the second end 410 along the upper surface 420 of the chewing gum product 400. Although upper circumference QQ is shown as a straight line in FIG. 19, it is understood the upper circumference QQ extends along the upper surface of the product 400 and may not necessarily be a straight line. The first tapered portion 416 may have a length that is at least 25%, or from about 25% to about 35% the length of the upper circumference QQ.

In an embodiment, the chewing gum product 400 may include a lower circumference RR extending from the first end 408 to the second end 410 along a lower surface 422 of the chewing gum product 400. Although lower circumference RR is shown as a straight line in FIG. 19, it is understood the lower circumference RR extends along the lower surface of the product and may not necessarily be a straight line. In an embodiment, the lower circumference RR is greater than the upper circumference QQ.

In an embodiment, the chewing gum product 400 may include a first side 426 and a second side 428 as shown in FIG. 18. The first and second ends 408, 410 and the first and second sides 426, 428 may form a perimeter LL. The first and second sides 426, 428 may have respective inwardly curved portions 430 and 432. The inwardly curved portions 430, 432 may provide the perimeter LL with an hour-glass shape or a dog-bone shape or otherwise a concave shape. In an embodiment, the chewing gum product 400 may have a width ratio from about 65% to about 85%, or any value therebetween. In an embodiment, the width ration may be from about 70% to about 80%,. The width ratio may be calculated by determining the minimum width of the chewing gum product 400, distance TT of FIG. 18, and dividing this value by the maximum width of the chewing gum product, distance UU of FIG. 18 as discussed above. In an embodiment, the chewing gum product may have the dimensions as set forth in Table 1 above. In a further embodiment, the chewing gum product 400 may have a pillow shape as shown in FIG. 18, for example.

In an embodiment, the chewing gum product 400 may have edges 434, 436, 438, and 440. The edges 434-440 may be rounded or otherwise curved. The rounded edges 434-440 advantageously promote uniform coating of the chewing gum product 400. In addition the rounded edges 434-440 reduce the amount of chipping experienced by chewing gum product during processing and/or handling.

In an embodiment, the inner portion 404 may be any fluid or flowable center-fill material as discussed herein. Nonlimiting examples of suitable compositions for the inner portion 404 include a liquid, a semi-liquid, a gel, a paste, a semi-solid, a flowable solid, and combinations thereof. In an embodiment, the inner portion 404 may be from about 5% to about 25% by weight, or from about 10% to about 15% by weight of the chewing gum product.

In an embodiment, a coating 442 may be applied to some or all of the body 402 to form a coated chewing gum product 444 as shown in FIGS. 20-22. The coating 442 may be any coating/coating material as discussed above. The coating 442 may be applied in any suitable manner as discussed above.

In an embodiment, the coating material may be applied to the chewing gum product 400 to mask, cover, or otherwise conceal the asymmetrical shape of the body 402. The coating 442 may cover the body 402 so that the coated chewing gum product 444 is symmetrical along the plane MM as shown in FIG. 21. Thus, the asymmetrical chewing gum product 400 may be used as a core to advantageously form a finished coated chewing gum product that is symmetrical and aesthetically pleasing to consumers. For example, the chewing gum product 400, shown with phantom lines in FIG. 20, is covered with the coating 442 to form the coated chewing gum product 444.

In an embodiment, the coated chewing gum product 444 may include first, second, third, and fourth tapered portions 446, 448, 450, and 452 as shown in FIG. 21. The tapered portions 446-452 may be planar, flat, or substantially flat as previously discussed. The first tapered portion 446 may extend from a first end 454 to an upper portion 456. Similarly, the second tapered portion 448, may extend from a second end 458 to the upper portion 456. The third tapered portion 450 may extend from the first end 454 to a lower portion 460. The fourth tapered portion 452 may extend from the second end 458 to the lower portion 460. The upper and lower portions 456, 460 may include planar portions. In other words, some or all of either or both of upper and lower portions 456, 460 may be parallel to, or substantially parallel to, the plane MM.

The first tapered portion 446 and the third tapered portion 450 may form an angle VV as shown in FIG. 21. Similarly, the second and fourth tapered portions 448, 452 may form an angle WW. The magnitudes of angles VV and/or WW may be from about 60° to about 120°, or from about 66° to about 110°, or from about 70° to about 90°, or from about 75° to about 85°, or any magnitude therebetween. The magnitude of angles VV and WW may be the same or different. In an embodiment, the magnitudes of the angles VV and WW may be the same or substantially the same. Angles VV and WW having the same or substantially the same magnitude advantageously contribute to the symmetry of the coated chewing gum product 444.

In an embodiment, the coated chewing gum product 444 may include a first side 462 and a second side 464 as shown in FIGS. 20 and 22. The first and second ends 454, 458 and the first and second sides 462, 464 may form a perimeter XX. The first and second sides 462, 464 may have respective inwardly curved portions 466 and 468. The inwardly curved portions 466, 468 may provide the perimeter XX with an hour-glass shape or a dog-bone shape or otherwise a concave shape. In an embodiment, the coated chewing gum product 444 may have a width ratio from about 65% to about 85%, or any value therebetween. In an embodiment, the width ration may be from about 70% to about 80%. The width ratio may be calculated by determining the minimum width of the coated chewing gum product 444, YY of FIG. 22, and dividing this value by the maximum width of the chewing gum product, distance ZZ of FIG. 22 as previously discussed. The minimum width (or YY) of the chewing gum product 444 may typically be the distance between the innermost portions of the inwardly curved side portions 466, 468. The maximum width (or ZZ) of the chewing gum product 444 may typically be the distance between an end on one side and an opposing second end located on the other side of the coated chewing gum product 444 (i.e., the distance or length between first end 454 and second end 458). The width ratio for the coated chewing gum product 444 may be any value previously discussed for the width ratio of the chewing gum product 400.

In an embodiment, the coated chewing gum product 444 has a weight from about 1.8 grams to about 2.4 grams, or about 2.2 grams, or any weight therebetween. The weight may or may not include the weight of the coating.

Figure 23:
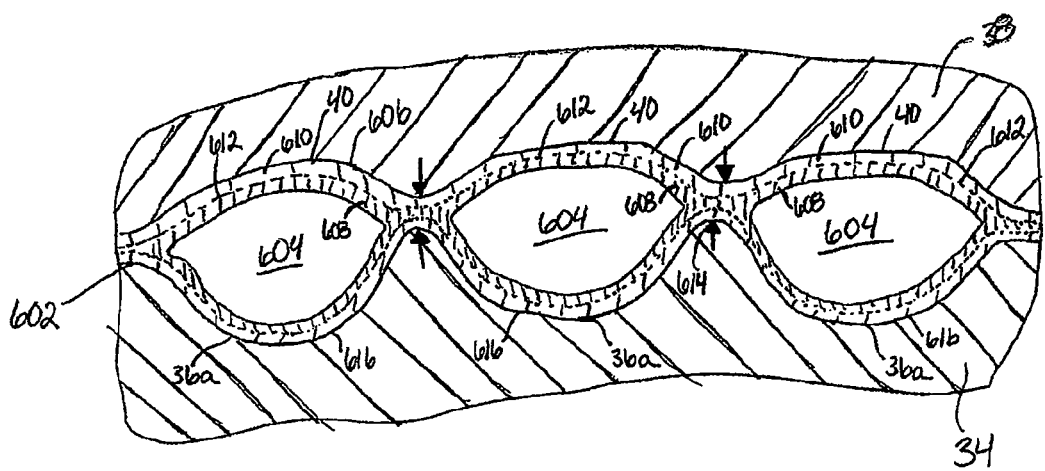
FIG. 23 is a schematic representation of a center-filled chewing gum product of the present disclosure.

In an embodiment, a rope 602 includes a center or a center portion 604 of a heat stable fill material and an outer layer of a chewing gum material 606 as shown in FIG. 23. The chewing gum material 606 has an inner portion 608 and an outer portion 610. The rope 602 enters the forming device 18 and is crimped and sealed by the first and second forming members 36a, 40 as previously discussed. The temperature of the fill material 604 upon exit from the coextrusion device 14 is adjusted so that when the rope of chewing gum material 602 enters area C of the forming device 18, the temperature of the fill material 604 is greater than about 40° C. or about 45° C. The skilled artisan will appreciate that this may require the coextrusion exit temperature of the fill material 604 to be greater than about 40° C. or about 45° C. In an embodiment, the temperature of the fill material 604 is from about 40° C. to about 60° C. or any value therebetween. In another embodiment, the temperature of the fill material 604 is from about 45° C. to about 55° C. or any value therebetween.

The fill material 604 may have a temperature that is different from a temperature of the outer layer of the chewing gum material 606. For example, the fill material 604 may have a higher or lower temperature than the chewing gum material 606. In an embodiment, the fill material 604 has a temperature that is from about 1° C. to about 10° C. higher than the chewing gum material 606. In another embodiment, the temperature of the fill material 604 is at least about 1° C. higher than a temperature of the chewing gum material 606. In yet another embodiment, the temperature of the fill material 604 is at least about 2° C. higher than a temperature of the chewing gum material 606. In still yet another embodiment, the temperature of the fill material 604 is at least about 3° C. higher than a temperature of the chewing gum material 606. In another embodiment, the temperature of the fill material 604 is at least about 4° C. higher than a temperature of the chewing gum material 606. In yet another embodiment, the temperature of the fill material 604 is at least about 5° C. higher than a temperature of the chewing gum material 606.

The fill material 604 creates a thermal gradient 612 across the chewing gum material 606. In other words, the temperature of the inner portion 608 is different than the temperature of the outer portion 610. On one side of the thermal gradient 612, the heat from the fill material 604 radiates through the inner surface of the chewing gum material 606 and into the inner portion 608, heating the inner portion 608. On the other side of the thermal gradient 612, the outer portion 610 of the chewing gum material 606 is not heated by the fill material 604 and has a temperature lower than the temperature of the inner portion 608. When the heated inner surfaces of the inner portion 608 come together during the crimping and sealing of the forming process, the higher temperature of the inner portion 608 improves the sealability of the sealed ends 614. The heat of the fill material 604 increases the temperature of the inner portion 608, increasing the fluidity and tackiness of the inner portion 608, increasing the adhesiveness and the ability of the inner portion 608 to mold, meld and/or fuse with itself when the inner portion is closed upon itself to form a sealed end 614. This forms a sealed chewing gum piece 616. By improving the bondability of the inner portion 608, the heated fill material 604 advantageously reduces the number of "leakers" and concomitantly improves production efficiency.

In an embodiment, a temperature differential from about 0° C. to about 20° C., or any value therebetween, is created along the thermal gradient 612, as will be discussed further below. One or both wheels 34, 38 may be in operative communication with a cooling device (not shown). The cooling device may comprise any cooling device known in the art for cooling apparatuses for producing confectionery products. In an embodiment, the cooling device may include, for example, a device that sprays cooled air onto the forming members 36 (or 36a, or 36b) and 40. The cooling device may cool the forming members 36 (or 36a, or 36b) and 40 to a temperature from about −5° C. to about 15° C. In another embodiment, the cooling device may cool the forming members 36 (or 36a, or 36b) and 40 to a temperature from about 2° C. to about 10° C. In yet another embodiment, the cooling device may cool the forming members 36 (or 36a, or 36b) and 40 to a temperature of about 5° C. Contact between the cooled forming members 36a, 40 and the rope of chewing gum material 602, cools the outer portion 610 to a temperature from about 20° C. to about 50° C., or any value therebetween. In another embodiment, the outer portion 610 is cooled to a temperature from about 30° C. to about 40° C. In yet another embodiment, the outer portion 610 is cooled to a temperature of about 35° C. Thus, during crimping and sealing, the outer portion 610 may have a temperature that is less than the inner portion 608, thereby yielding a temperature differential across the thermal gradient from about 0° C. to about 20° C. In another embodiment, the temperature differential across the thermal gradient may be from about 2° C. to about 15° C. In yet another embodiment, the temperature differential across the thermal gradient may be from about 5° C. to about 10° C.

In another embodiment, the temperature differential may be created by directly cooling the outer portion 610 of the chewing gum material 606. In this embodiment, instead of cooling the forming members 36 (or 36a, or 36b) and 40, which, in turn, cool the outer portion 610 of the chewing gum material 606, the outer portion 610 may be exposed to a cooling device that cools the outer portion 610 either prior to or just after forming in the forming members 36 (or 36a, or 36b) and 40. For example, the outer portion 610 may be cooled by a device that sprays cooled air directly onto the outer portion 610. Alternatively, the rope 602 may be passed through a cooling chamber prior to forming in the forming members 36 (or 36a, or 36b) and 40. The skilled artisan will appreciate, however, that the cooling of the outer portion 610 may occur by the use of any cooling device known in the art for cooling confectionery products. Similarly, the skilled artisan will also appreciate that the cooling of the outer portion 610 may occur by cooling both the forming members 36 (or 36a, or 36b) and 40, directly cooling the outer portion 610 using a cooling device, and combinations thereof.

Provision of this temperature differential carries several advantages. Maintaining the inner portion 608 at a temperature greater than the outer portion 610 may improve the bond strength of the sealed ends 614 as previously discussed. Moreover, provision of the outer portion 610 at a low or cool temperature reduces the adhesion between the outer portion 610 and the forming members 36a, 40. Low adhesion between the forming members and the outer portion 610 is beneficial as it improves the release or discharge of the sealed chewing gum piece 616 from the forming members. This improves production efficiency by reducing the time required to form and discharge the sealed chewing gum piece 616 with/from the forming device 18.

One of ordinary skill in the art will appreciate the synergy achieved with the temperature differential across the thermal gradient 612. In an embodiment, the temperature differential permits the sealed chewing gum piece 616 to be released from one or both forming members 36a, 40 without the use of an ejection device. In a further embodiment, the shape of the first forming member 36a may be different than the shape of the second forming member 40 as discussed above. Alternatively, either forming member 36 or forming member 36b may be used in conjunction with the forming member 40.

Figure 24:
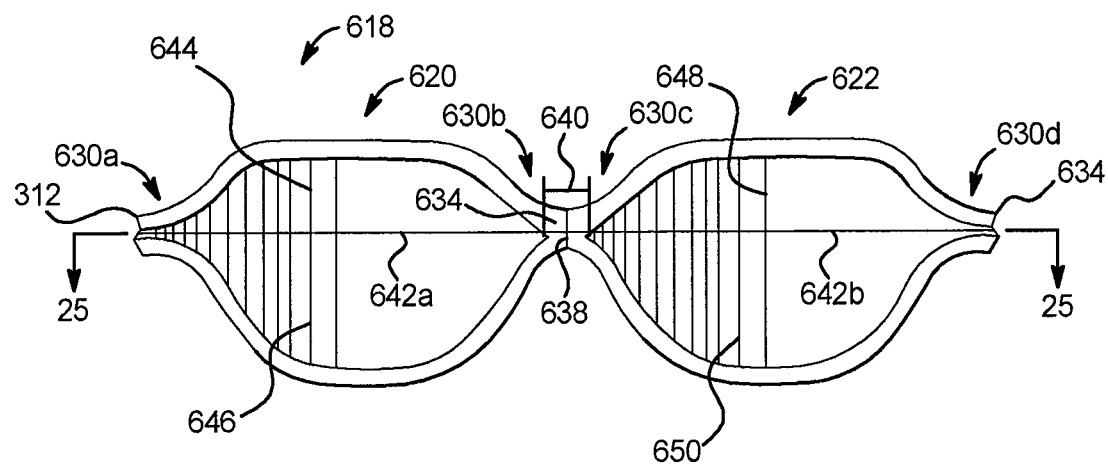
FIG. 24 is an elevation view of a center-filled chewing gum product of the present disclosure.
Figure 25:
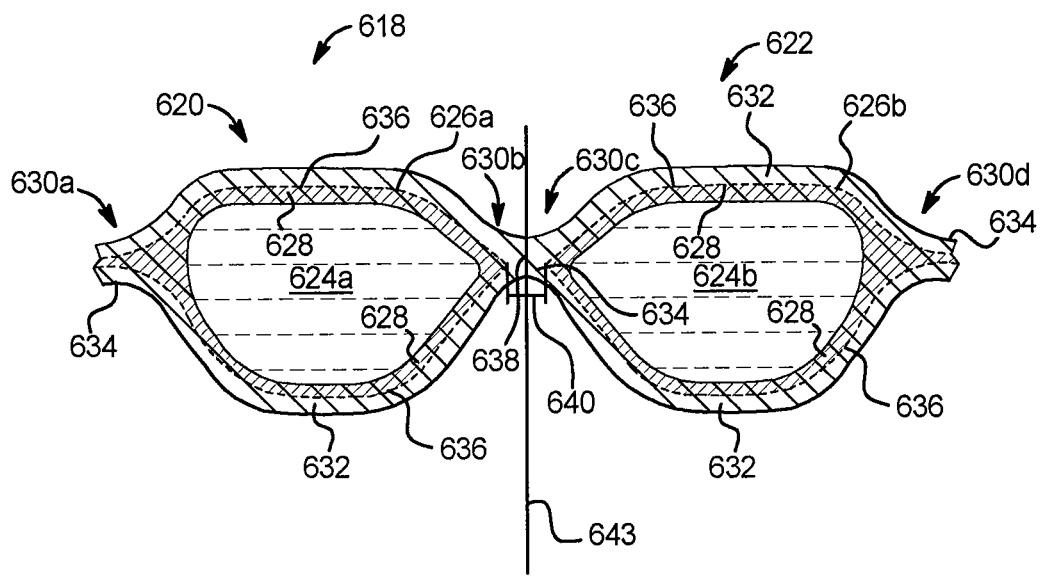
FIG. 25 is a sectional view taken along line 25-25 of FIG. 24.

In an embodiment, a chewing gum product 618 is provided as shown in FIGS. 24 and 25. It is understood that chewing gum product 618 may include some, all, or part of beaded rope 44. The chewing gum product 618 may be an intermediate product or a finished product. The chewing gum product 618 includes a first piece 620 and a second piece 622, each piece having a respective fill material 624a, 624b in or within a respective chewing gum material 626a, 626b. The fill material 624a, 624b and the chewing gum material 626a, 626b respectively correspond to the center-fill portion and the outer portion of the rope 28. Consequently, the fill material 624a, 624b has a temperature greater than about 40° C., or from about 40° C. to about 50° C. or any value therebetween, or from about 45° C. to about 55° C. or any value therebetween. Each piece 620, 622 may have sealed ends 630a, 630b, (piece 620) 630c, and 630d (piece 622). A land 634 attaches or otherwise connects sealed end 630b of the first piece 620 with the sealed end 630c of the second piece 622.

The chewing gum material 312 includes an inner portion 628 and an outer portion 632 with a thermal gradient 636 between the portions 628, 632. In an embodiment, the temperature of the inner portion 628 is from about 5° C. to about 10° C. greater than the temperature of the outer portion 632 as previously discussed. The skilled artisan will appreciate, however, that the temperature differential may be greater or less than 5° C. to about 10° C., as previously discussed.

The land 634 is formed as a result of the cooperative engagement of the first and second forming members 36a, 40 as discussed above. The crimping pressure imposed upon the rope 28 when the first and second forming members 36a, 40 are in full cooperative engagement seals each piece 620, 622 and forms the land 634. Thus, the land 634 includes, or is an extension of, the chewing gum material 626a and/or 626b. In an embodiment, the land 634 includes only the chewing gum material 626a and/or 626b, with no, or substantially no, fill material present in the land 634.

In an embodiment, the land 634 has a thickness 638. The thickness 638 may be constant or may vary along a length 640 of the land. The thickness 638 may have a length from about 0.05 mm to about 0.25 mm or any value therebetween. In an embodiment, the thickness may be from about 0.1 mm to about 0.2 mm. The length 640 may be from about 0.05 mm to about 2.0 mm or any value therebetween. In an embodiment, the length 640 may be from about 0.5 mm to about 1.0 mm.

The land 634 may be any chewing gum material from which the outer portion of the rope 28 is made as discussed herein. In an embodiment, the land 634 may be solely chewing gum. In other words, the fill material 624a, 624b is absent or wholly absent in the land 634 as shown in FIG. 24.

In an embodiment, a plane 642a extends through the sealed ends 630a and 630b of the first piece 620. A plane 642b extends through the sealed ends 630c and 630d of the second piece 622 in a similar manner. In an embodiment, the first piece 620 may be asymmetrical along the plane 642a. In other words, upper portion 644 of piece 620 located above the plane 642a differs in size, shape, and/or volume when compared to the size, shape, and/or volume of the lower portion 646 of the piece 620. Similarly, the second piece 622 has an upper portion 648 which is asymmetrical to lower a portion 650 along the plane 642b. As the land 634 imparts flexibility to the chewing gum product 618, it is understood that planes 642a, 642b may or may not be coplanar, parallel, intersecting, and/or skewed.

In an embodiment, a plane 643 extends through the land 634 as shown in FIG. 25. The plane 643 is substantially normal to, or normal to, the land 634. The first piece 620 is symmetrical to, or substantially symmetrical to, the second piece 622. In other words, with- the plane 643 as the reference plane, the first piece 620 is substantially a mirror-image, or a mirror-image, to the second piece 622. In an embodiment, the plane 643 may be a plane of symmetry with respect to the first piece 620 and the second piece 622. Thus, the shape, size and configuration of the first piece 620 and the second piece 308 is identical or substantially identical.

Similar to the rope 44, the chewing gum product 618 may have the form of a rope and include a plurality of sealed center-filled pieces, adjacent pieces being attached to each other at the sealed ends by way of lands located between sealed ends of adjacent pieces. Thus, chewing gum product 618 may emerge from the forming device 18 as a continuous, unitary, bead-like or rosary-like strand. Alternatively, the attached pieces 620, 622 may be separated from each other to form a plurality of individual sealed center-filled chewing gum pieces as previously discussed. The individual sealed chewing gum pieces may have any shape as previously described.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for producing a chewing gum product comprising:

extruding a rope of a chewing gum material comprising an outer layer of a chewing gum material having a first temperature and a center comprising a fill material having a second temperature; and sealing an end of the chewing gum material when the second temperature is greater than the first temperature.

2. The method of claim 1, comprising sealing opposing ends of the chewing gum material to form a sealed filled chewing gum piece.

3. The method of claim 2, comprising feeding the rope between a first forming member and a second forming member cooperatively engageable with the first forming member and removing the sealed filled chewing gum piece from at least one of the forming members.

4. The method of claim 1, wherein the difference between the first temperature and the second temperature is at least about 1° C. when the sealing occurs.

5. The method of claim 1, wherein the difference between the first temperature and the second temperature is at least about 2° C. when the sealing occurs.

6. The method of claim 1, wherein the difference between the first temperature and the second temperature is at least about 3° C. when the sealing occurs.

7. The method of claim 1, wherein the difference between the first temperature and the second temperature is at least about 4° C. when the sealing occurs.

8. The method of claim 1, wherein the difference between the first temperature and the second temperature is at least about 5° C. when the sealing occurs.

9. The method of claim 1, comprising cooling an outer portion of the outer layer to a temperature from about 30° C. to about 40° C. after the extruding and prior to the sealing.

10. The method of claim 9, wherein the outer portion is cooled by spraying chilled air thereon.

11. A method for producing a center-filled chewing gum product comprising:
heating a liquid composition to a predetermined temperature;
coextruding a center-filled chewing gum rope comprising an outer material of a chewing gum composition and an inner material of the liquid composition, wherein a temperature of the outer material is lower than the temperature of the inner material when the center-filled chewing gum rope exits a coextruder;
crimping the center-filled rope in a first position to form a first seal;
crimping the center-filled rope in a second position to form a second seal; and
separating the rope at the first and second seals to form a center-filled chewing gum piece.

12. The method of claim 11, comprising heating the liquid composition to a temperature from about 45° C. to about 55° C.

13. The method of claim 11, wherein the temperature of the outer material is at least about 1° C. lower than the temperature of the inner material when the center-filled chewing gum rope exits the coextruder.

14. The method of claim 11, wherein the temperature of the outer material is at least about 2° C. lower than the temperature of the inner material when the center-filled chewing gum rope exits the coextruder.

15. The method of claim 11, wherein the temperature of the outer material is at least about 3° C. lower than the temperature of the inner material when the center-filled chewing gum rope exits the coextruder.

16. The method of claim 11, wherein the temperature of the outer material is at least about 4° C. lower than the temperature of the inner material when the center-filled chewing gum rope exits the coextruder.

17. The method of claim 11, wherein the temperature of the outer material is at least about 5° C. lower than the temperature of the inner material when the center-filled chewing gum rope exits the coextruder.

* * * * *